United States Patent
Wei et al.

(10) Patent No.: US 11,336,344 B2
(45) Date of Patent: May 17, 2022

(54) UE-RS-BASED OPEN-LOOP AND SEMI-OPEN-LOOP MIMO

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US); Hao Xu, Beijing (CN); Neng Wang, Lund (SE); Xiaohui Liu, Lund (SE); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/092,764

(22) Filed: Nov. 9, 2020

(65) Prior Publication Data

US 2021/0058120 A1 Feb. 25, 2021

Related U.S. Application Data

(62) Division of application No. 16/078,526, filed as application No. PCT/CN2017/077674 on Mar. 22, 2017, now Pat. No. 10,868,594.

(30) Foreign Application Priority Data

Apr. 1, 2016 (WO) ................ PCT/CN2016/078312

(51) Int. Cl.
*H04B 7/06* (2006.01)
*H04B 7/0456* (2017.01)
(Continued)

(52) U.S. Cl.
CPC ......... *H04B 7/0478* (2013.01); *H04B 7/0456* (2013.01); *H04B 7/0617* (2013.01);
(Continued)

(58) Field of Classification Search
CPC ... H04L 5/0057; H04L 1/0026; H04L 5/0026; H04L 27/2607; H04L 5/0051;
(Continued)

(56) References Cited

U.S. PATENT DOCUMENTS

| 8,923,143 B2 | 12/2014 | Gorokhov et al. |
| 9,166,849 B2 | 10/2015 | Chen et al. |

(Continued)

FOREIGN PATENT DOCUMENTS

| CN | 102244559 A | 11/2011 |
| CN | 102916766 A | 2/2013 |

(Continued)

OTHER PUBLICATIONS

International Preliminary Report on Patentability—PCT/CN2016/078312, The International Bureau of WIPO—Geneva, Switzerland, dated Oct. 11, 2018 (162693WO1).

(Continued)

*Primary Examiner* — Rahel Guarino
(74) *Attorney, Agent, or Firm* — Qualcomm Incorporated

(57) ABSTRACT

Design of precoding and feedback for user equipment (UE)-specific reference signals (UE-RS)-based open-loop and semi-open-loop multiple input, multiple output (MIMO) systems is discussed. Aspects of the present disclosure provide for sub-resource block (RB) random precoding that allows for greater diversity gain in a lower bandwidth. In addition, the recoding may be performed using resource element (RE)-level layer shifting that provides for a number of precoders to be assigned to a number of layers for every such continuous subcarrier. As such, two codewords may experience the same effective channel quality with channel quality indicators (CQI) being averaged across all of the layers.

19 Claims, 14 Drawing Sheets

(51) Int. Cl.
*H04L 5/00* (2006.01)
*H04L 27/26* (2006.01)

(52) U.S. Cl.
CPC ......... *H04B 7/0632* (2013.01); *H04B 7/0671* (2013.01); *H04L 5/0023* (2013.01); *H04L 5/0039* (2013.01); *H04L 5/0051* (2013.01); *H04L 5/0057* (2013.01); *H04L 27/26* (2013.01); *H04L 27/2607* (2013.01); *H04L 27/2636* (2013.01)

(58) Field of Classification Search
CPC ... H04L 5/0039; H04B 7/0632; H04B 7/0626; H04B 7/0456; H04B 7/0469; H04B 7/0478; H04B 7/0486; H04B 7/0617; H04B 7/065; H04B 7/046; H04B 7/0482; H04B 7/0697; H04B 7/10
See application file for complete search history.

(56) References Cited

U.S. PATENT DOCUMENTS

| | | |
|---|---|---|
| 2005/0281350 A1 | 12/2005 | Chae et al. |
| 2011/0255505 A1 | 10/2011 | Liu et al. |
| 2013/0163530 A1 | 6/2013 | Chen et al. |
| 2014/0016714 A1 | 1/2014 | Chen et al. |
| 2015/0117249 A1 | 4/2015 | Zhou et al. |
| 2016/0211895 A1 | 7/2016 | Onggosanusi et al. |
| 2019/0089429 A1 | 3/2019 | Wei et al. |
| 2019/0097693 A1* | 3/2019 | Park ................... H04B 7/0417 |

FOREIGN PATENT DOCUMENTS

| | | |
|---|---|---|
| CN | 103460618 A | 12/2013 |
| CN | 103718487 A | 4/2014 |
| CN | 103746779 A | 4/2014 |
| EP | 2571185 A1 | 3/2013 |
| JP | 2012100254 A | 5/2012 |
| KR | 20150126134 A | 11/2015 |
| WO | WO-2012108913 A1 | 8/2012 |
| WO | WO-2013037060 A1 | 3/2013 |

OTHER PUBLICATIONS

International Preliminary Report on Patentability—PCT/CN2017/077674, The International Bureau of WIPO—Geneva, Switzerland, dated Oct. 11, 2018 (162693WO2).
International Search Report and Written Opinion—PCT/CN2016/078312—ISA/EPO—dated Jan. 3, 2017 (162693WO1).
International Search Report and Written Opinion—PCT/CN2017/077674—ISA/EPO—dated May 24, 2017 (162693WO2).
Nokia Networks: "Discussion on the Downlink Superposed Transmission", 3GPP Draft; R1-152000, 3rd Generation Partnership Project (3GPP), Mobile Competence Centre ; 650, Route Des Lucioles ; F-06921 Sophia-Antipolis Cedex ; France, vol. RAN WG1, No. Belgrade, Serbia; Apr. 20, 2015-Apr. 24, 2015 Apr. 19, 2015, XP050934849, Retrieved from the Internet: URL:http://www.3gpp.org/ftp/Meetings_3GPP_SYNC/RAN1/Docs/ [retrieved on Apr. 19, 2015], Chapters 2.2.1-2.2.2, 4 pages.
Renesas Mobile Europe Ltd: "Verifying PMI Accuracy for eDL-MIMO", 3GPP Draft; R4-113694, 3rd Generation Partnership Project (3GPP), Mobile Competence Centre ; 650, Route Des Lucioles ; F-06921 Sophia-Antipolis Cedex ; France, vol. RAN WG4, No. Roma; Jun. 27, 2011, Jun. 22, 2011, XP050542832, [retrieved on Jun. 22, 2011], Chapter 4, 12 pages.
Supplementary European Search Report—EP17773122—Search Authority—City—Jan. 21, 2020 (162693EP).
Supplementary Partial European Search Report—EP17773122—Search Authority—Munich—dated Sep. 27, 2019 (162693EP).

* cited by examiner

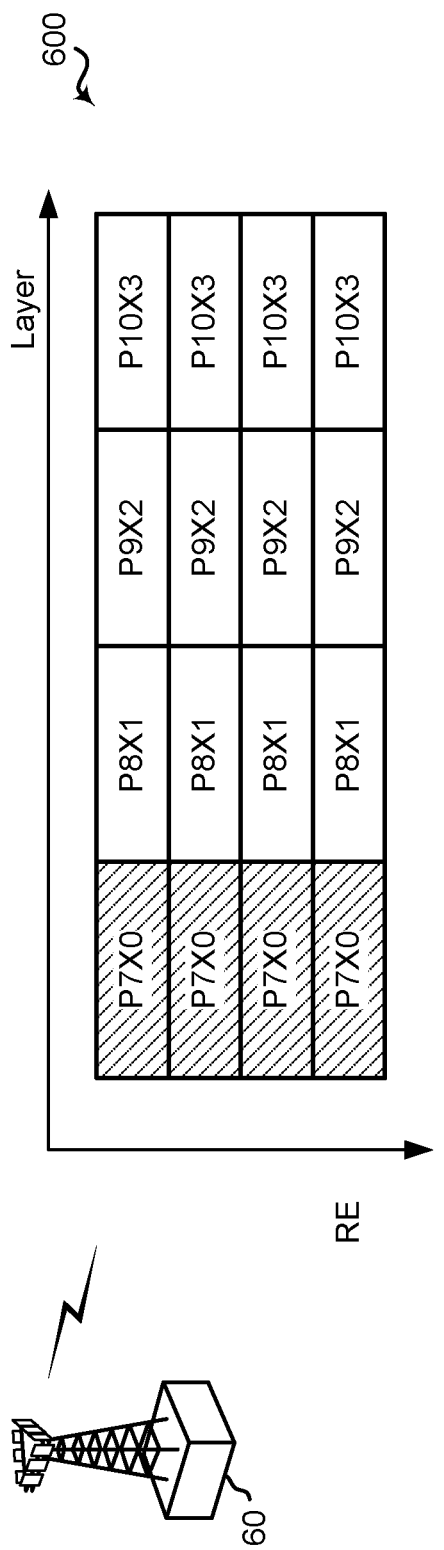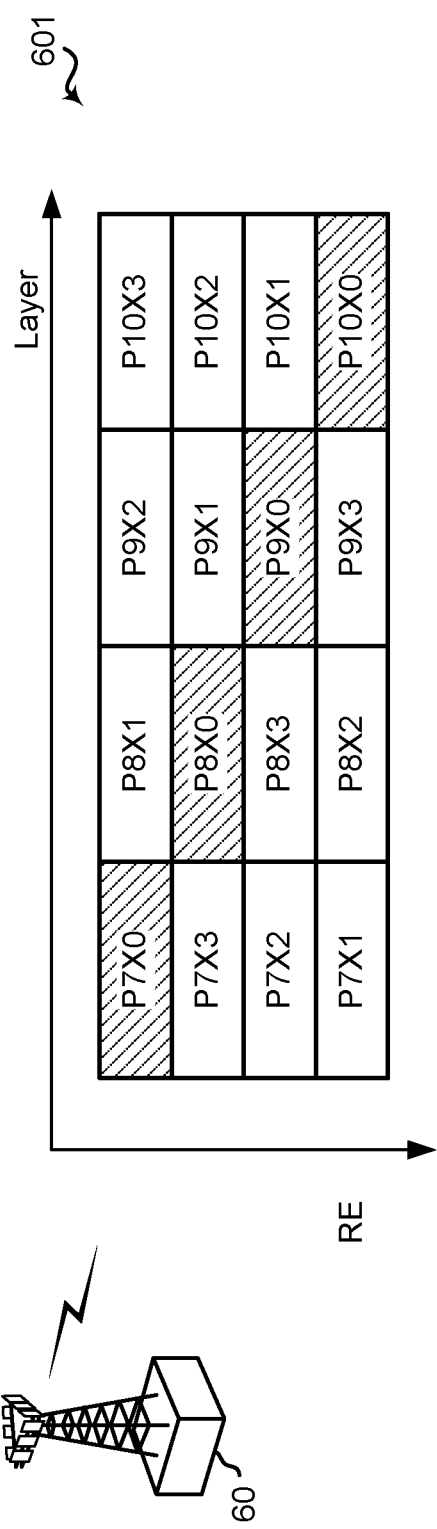
FIG. 6A
FIG. 6B

UE-RS-BASED OPEN-LOOP AND SEMI-OPEN-LOOP MIMO

CROSS-REFERENCE TO RELATED APPLICATIONS

This application is a divisional application of U.S. patent application Ser. No. 16/078,526, entitled "UE-RS-BASED OPEN-LOOP AND SEMI-OPEN-LOOP MIMO," filed on Aug. 21, 2018, which claims the benefit of and priority to International PCT Patent Application No. PCT/CN2017/077674, entitled "UE-RS-BASED OPEN-LOOP AND SEMI-OPEN-LOOP MIMO," filed on Mar. 22, 2017, which claims the benefit of and priority to International PCT Patent Application No. PCT/CN2016/078312, entitled, "UE-RS-BASED OPEN-LOOP AND SEMI-OPEN-LOOP MIMO," filed on Apr. 1, 2016. All of said applications are incorporated herein by reference as if fully set forth below in their entireties and for all applicable purposes.

BACKGROUND

Field

Aspects of the present disclosure relate generally to wireless communication systems, and more particularly, to user equipment (UE) reference signal (UE-RS)-based open-loop and semi-open-loop multiple input, multiple output (MIMO).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes randomly selecting a first precoder associated with a first transmission block, wherein the first transmission block includes one of: a first resource block, a first set of bundled resource blocks, or a first sub-resource block selected as a group of contiguous resource elements within a resource block, transmitting user equipment (UE)-specific reference signals (UE-RS) and data within the first transmission block, wherein the UE-RS and data are precoded using the first precoder, selecting a next precoder associated with a next transmission block, wherein the next transmission block includes one of: a next resource block, a next set of bundled resource blocks, or a next sub-resource block selected as a next group of contiguous resource elements within the resource block, and transmitting the UE-RS and data in the next transmission block, wherein the UE-RS and data are precoded with a next precoder.

In an additional aspect of the disclosure, a method of wireless communication includes obtaining a first port virtualization matrix for mapping a predetermined number of antennas into a subset of virtualized antenna ports, transmitting in a first transmission block a UE-RS precoded with the first port virtualization matrix, wherein the first transmission block is one of: a first resource block or a first set of bundled resource blocks, precoding data using a random beamformer, wherein the random beamformer includes the first port virtualization matrix and a second precoding matrix selected from a set of precoding matrices associated with the subset of virtualized antenna ports, and transmitting the precoded data in the first transmission block.

In an additional aspect of the disclosure, a method of wireless communication includes measuring a reference signal received from a base station, determining a set of wideband and subband precoders associated with a configured antenna array, transmitting a rank indicator, wherein the rank indicator corresponds to a number of useful layers in a transmission channel, transmitting a precoding matrix indicator (PMI), wherein the PMI is associated with a wideband precoding matrix selected from a set of predetermined wideband precoders, and transmitting a channel quality indicator (CQI) generated based on the measured reference signal, wherein the channel quality indicator is generated according to an assumption that precoder elements are cycled from a set of predetermined subband precoders.

In an additional aspect of the disclosure, an apparatus configured for wireless communication includes means for randomly selecting a first precoder associated with a first transmission block, wherein the first transmission block includes one of: a first resource block, a first set of bundled resource blocks, or a first sub-resource block selected as a group of contiguous resource elements within a resource block, means for transmitting UE-RS and data within the first transmission block, wherein the UE-RS and data are precoded using the first precoder, means for selecting a next precoder associated with a next transmission block, wherein the next transmission block includes one of: a next resource block, a next set of bundled resource blocks, or a next sub-resource block selected as a next group of contiguous resource elements within the resource block, and means for transmitting the UE-RS and data in the next transmission block, wherein the UE-RS and data are precoded with a next precoder.

In an additional aspect of the disclosure, an apparatus configured for wireless communication includes means for obtaining a first port virtualization matrix for mapping a predetermined number of antennas into a subset of virtualized antenna ports, means for transmitting in a first transmission block a UE-RS precoded with the first port virtualization matrix, wherein the first transmission block is one of: a first resource block or a first set of bundled resource blocks, means for precoding data using a random beamformer, wherein the random beamformer includes the first port virtualization matrix and a second precoding matrix selected from a set of precoding matrices associated with the subset of virtualized antenna ports, and means for transmitting the precoded data in the first transmission block.

In an additional aspect of the disclosure, an apparatus configured for wireless communication includes means for measuring a reference signal received from a base station, means for determining a set of wideband and subband precoders associated with a configured antenna array, means for transmitting a rank indicator, wherein the rank indicator corresponds to a number of useful layers in a transmission channel, means for transmitting a PMI, wherein the PMI is associated with a wideband precoding matrix selected from a set of predetermined wideband precoders, and means for transmitting a CQI generated based on the measured reference signal, wherein the channel quality indicator is generated according to an assumption that precoder elements are cycled from a set of predetermined subband precoders.

In an additional aspect of the disclosure, a non-transitory computer-readable medium having program code recorded thereon. The program code further includes code to randomly select a first precoder associated with a first transmission block, wherein the first transmission block includes one of: a first resource block, a first set of bundled resource blocks, or a first sub-resource block selected as a group of contiguous resource elements within a resource block, code to transmit UE-RS and data within the first transmission block, wherein the UE-RS and data are precoded using the first precoder, code to select a next precoder associated with a next transmission block, wherein the next transmission block includes one of: a next resource block, a next set of bundled resource blocks, or a next sub-resource block selected as a next group of contiguous resource elements within the resource block, and code to transmit the UE-RS and data in the next transmission block, wherein the UE-RS and data are precoded with a next precoder.

In an additional aspect of the disclosure, a non-transitory computer-readable medium having program code recorded thereon. The program code further includes code to obtain a first port virtualization matrix for mapping a predetermined number of antennas into a subset of virtualized antenna ports, code to transmit in a first transmission block a UE-RS precoded with the first port virtualization matrix, wherein the first transmission block is one of: a first resource block or a first set of bundled resource blocks, code to precode data using a random beamformer, wherein the random beamformer includes the first port virtualization matrix and a second precoding matrix selected from a set of precoding matrices associated with the subset of virtualized antenna ports, and code to transmit the precoded data in the first transmission block.

In an additional aspect of the disclosure, a non-transitory computer-readable medium having program code recorded thereon. The program code further includes code to measure a reference signal received from a base station, code to determine a set of wideband and subband precoders associated with a configured antenna array, code to transmit a rank indicator, wherein the rank indicator corresponds to a number of useful layers in a transmission channel, code to transmit a PMI, wherein the PMI is associated with a wideband precoding matrix selected from a set of predetermined wideband precoders, and code to transmit a CQI generated based on the measured reference signal, wherein the channel quality indicator is generated according to an assumption that precoder elements are cycled from a set of predetermined subband precoders.

In an additional aspect of the disclosure, an apparatus configured for wireless communication is disclosed. The apparatus includes at least one processor, and a memory coupled to the processor. The processor is configured to randomly select a first precoder associated with a first transmission block, wherein the first transmission block includes one of: a first resource block, a first set of bundled resource blocks, or a first sub-resource block selected as a group of contiguous resource elements within a resource block, to transmit UE-RS and data within the first transmission block, wherein the UE-RS and data are precoded using the first precoder, to select a next precoder associated with a next transmission block, wherein the next transmission block includes one of: a next resource block, a next set of bundled resource blocks, or a next sub-resource block selected as a next group of contiguous resource elements within the resource block, and to transmit the UE-RS and data in the next transmission block, wherein the UE-RS and data are precoded with a next precoder.

In an additional aspect of the disclosure, an apparatus configured for wireless communication is disclosed. The apparatus includes at least one processor, and a memory coupled to the processor. The processor is configured to obtain a first port virtualization matrix for mapping a predetermined number of antennas into a subset of virtualized antenna ports, to transmit in a first transmission block a UE-RS precoded with the first port virtualization matrix, wherein the first transmission block is one of: a first resource block or a first set of bundled resource blocks, to precode data using a random beamformer, wherein the random beamformer includes the first port virtualization matrix and a second precoding matrix selected from a set of precoding matrices associated with the subset of virtualized antenna ports, and to transmit the precoded data in the first transmission block.

In an additional aspect of the disclosure, an apparatus configured for wireless communication is disclosed. The apparatus includes at least one processor, and a memory coupled to the processor. The processor is configured to measure a reference signal received from a base station, to determine a set of wideband and subband precoders associated with a configured antenna array, to transmit a rank indicator, wherein the rank indicator corresponds to a number of useful layers in a transmission channel, to transmit a PMI, wherein the PMI is associated with a wideband precoding matrix selected from a set of predetermined wideband precoders, and to transmit a CQI generated based on the measured reference signal, wherein the channel quality indicator is generated according to an assumption that precoder elements are cycled from a set of predetermined subband precoders.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A and 6B are block diagrams illustrating transmission streams of an eNB configured according to aspects of the present disclosure.

DETAILED DESCRIPTION

Figure 1:
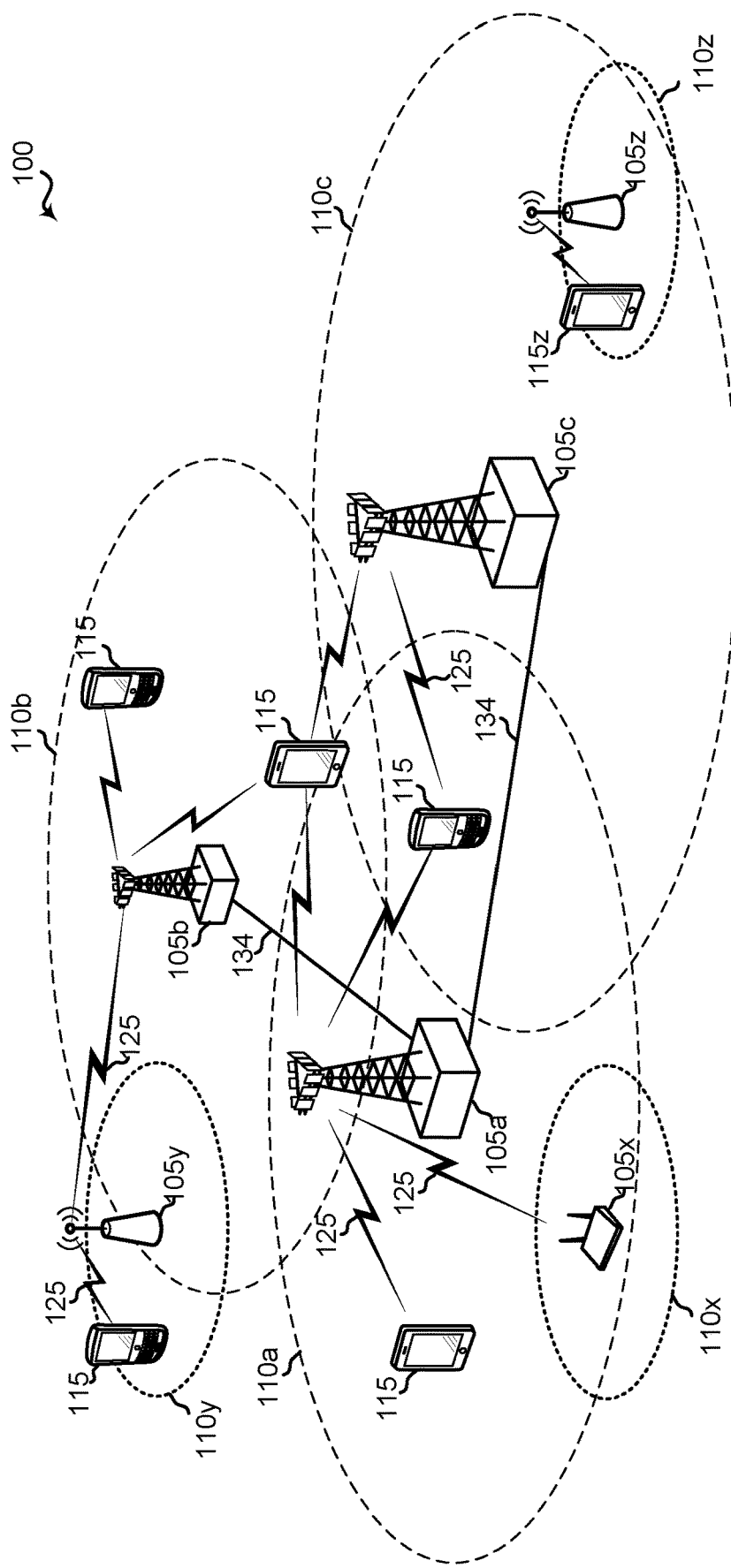
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
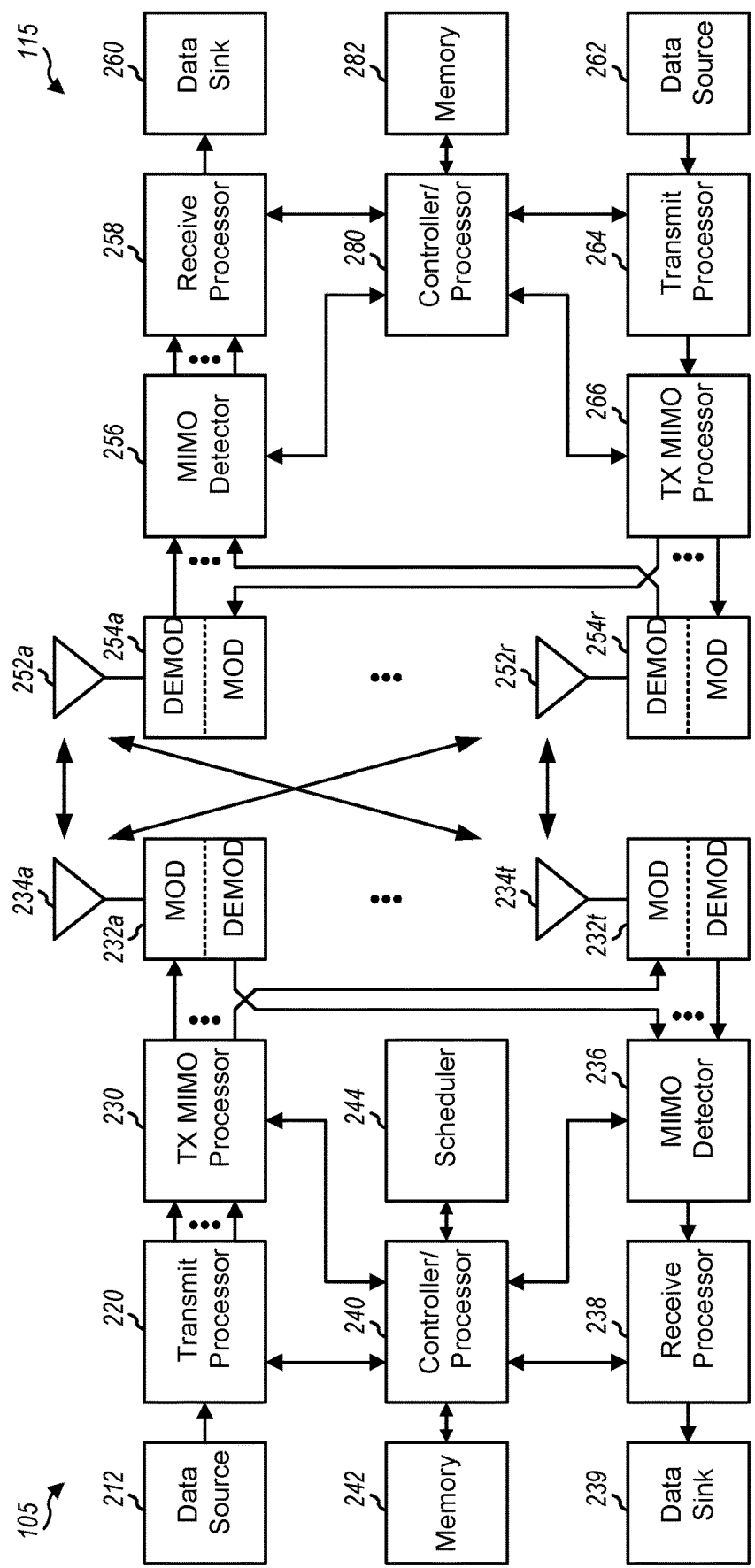
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 4, 7, and 10, and/or other processes for the techniques described herein.

The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
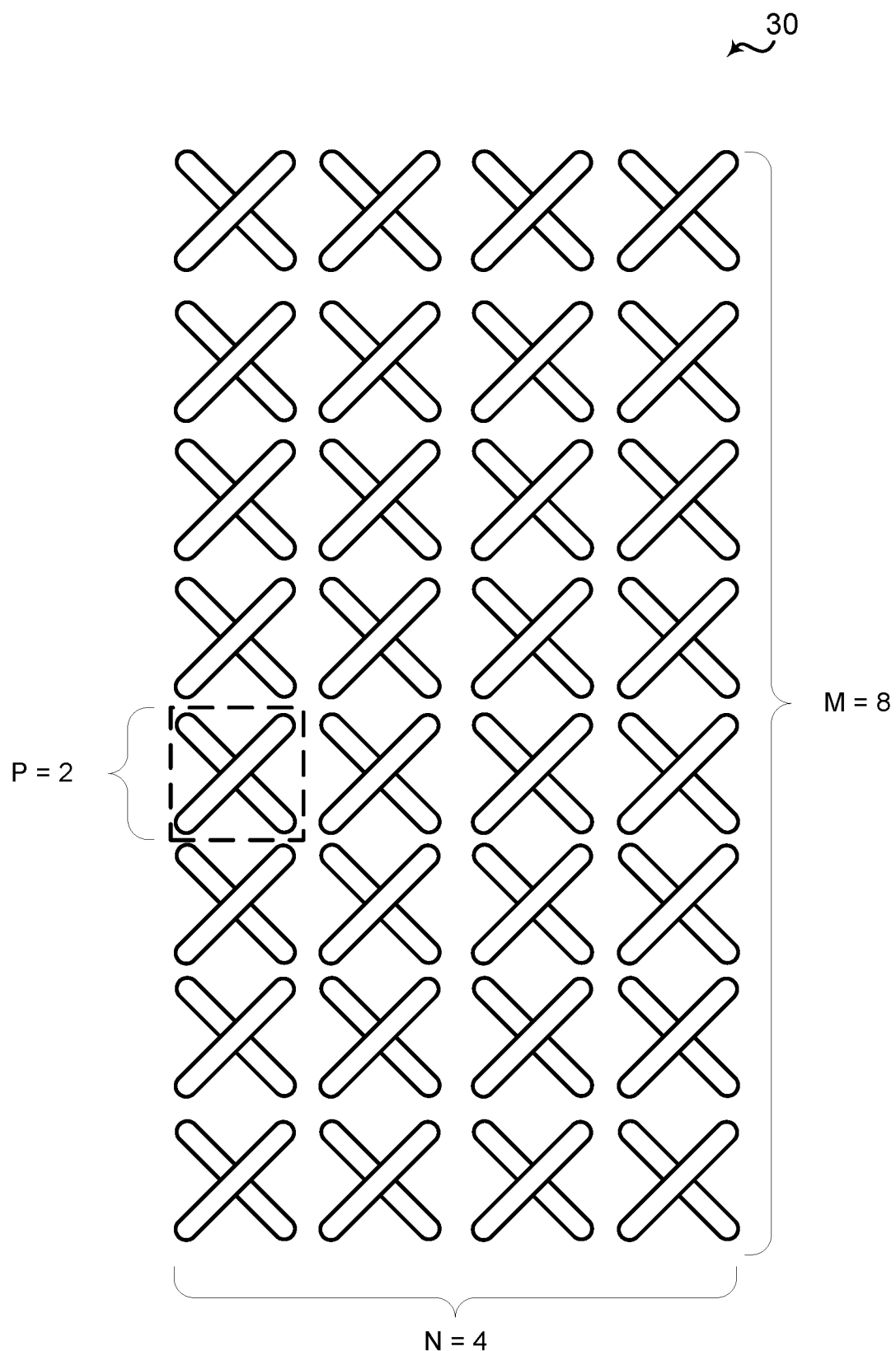
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

In LTE, different multi-antenna transmission modes may be employed for downlink data transmission in order to increase diversity, data rate, or both. For example, transmit diversity provides for communication using signals originating from two or more independent sources modulated with the same information-bearing signals and that may vary in their transmission characteristics at any given instant. In contrast, spatial multiplexing is a transmission mode in MIMO wireless communications that transmits independent and separately-encoded data signals or streams from each of the multiple transmit antennas. Spatial multiplexing may be closed-loop, in which the transmitter has knowledge of the channel conditions through feedback from the receiver, or open-loop, in which the transmitter and receiver do not exchange feedback information and the transmitter figures out the channel conditions on its own. Open-loop spatial multiplexing mode may be more beneficial for medium to high mobility UEs when the reliable PMI feedback is not available at the transmitter due to fast time update of the spatial channel.

In currently specified systems, open-loop spatial multiplexing is supported for common reference signal (CRS)-based transmission schemes. Two open-loop transmission schemes, e.g. transmit diversity of space-frequency block code (SFBC), or spatial multiplexing using a large delay CDD precoding are supported. For spatial multiplexing with large delay CDD precoding, both spatial multiplexing gain and diversity gain are achieved. UE-specific reference signal (UE-RS)-based open-loop (without PMI) or semi-open-loop (with reduced PMI) transmission are not yet supported in currently specified systems, but may be provided for in the future. It is expected that UE-RS based open-loop transmission may result in gains over CRS based transmit diversity and spatial multiplexing. In some configurations, such as 8 CSI-RS ports and 1 CRS port for 2 receive antenna and 4 receive antenna UEs, and 8 CSI-RS ports and 2 CRS ports for 4 receive antenna UEs, open-loop beamforming may outperform large delay CDD due to rank limitation. The gain may be further increased when more antenna ports are configured, such as in FD-MIMO. In addition on multicast-broadcast single frequency network (MBSFN) subframes, using CRS based transmit diversity schemes may be likely to perform poorly due to the absence of CRS in the PDSCH region and, hence, such a UE-RS based open loop scheme may benefit in supporting efficient data transmission to high speed UEs on MBSFN subframes.

In the current specification, the precoding for CRS based large delay CDD spatial multiplexing may be defined as follows:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad (1)$$

Where $y^{(p)}$ is the precoded transmitted signal, p is the antenna port index for P antennas, W(i) a random beamformer, D(i) is the CDD matrix, U is a discrete Fourier transform (DFT) rotational matrix, and x(i) is the data for transmission. The precoding matrix concatenates three matrices. The random beamformer, W(i), may be selected from a 2 transmit antenna (Tx)/4Tx codebook. The random beamformer, W(i), may change every v subcarriers and, for every v contiguous subcarriers, v beams may be formed when the channel rank v is greater than one. Within the v contiguous subcarriers, the CDD matrix, D(i), is a v×v diagonal matrix that assigns a different delay to the v beams, while the DFT rotational matrix, U, is a v×v matrix that maps the v beams to v data symbols. The matrix, U, may also implement averaging of channel quality indicator (CQI) measurements across all the layers and, thus, the difference in the CQI between two codewords may be unnecessary, leaving just one CQI to be reported by a UE for ranks greater than 1.

Several precoding schemes have been proposed for UE-RS-based open-loop spatial multiplexing. In a first proposed scheme (Scheme 1), both UE-RS and data (PDSCH) are precoded using the same random beamformer, which may stay constant for each RB or multiple bundled RBs when precoding bundling is configured. That is:

$$\begin{bmatrix} y^{(0)}(i) \\ \vdots \\ y^{(P-1)}(i) \end{bmatrix} = W(i_{RB}) \begin{bmatrix} x^{(0)}(i) \\ \vdots \\ x^{(v-1)}(i) \end{bmatrix} \quad (2)$$

It should be noted that a similar precoding structure to closed-loop single user (SU)-MIMO may be used for open-loop SU-MIMO, except that an eNB may cyclically assign different precoding elements from the codebook set to different RBs for PDSCH transmission instead of using the PMI feedback from a UE.

It should further be noted that the random precoding may be extended also to a dual codebook with $W(i_{RB}) = W_1 W_2(i_{RB})$, where $W_1$ is a long-term wideband precoding matrix of size $P \times N_b$ and $W_2(i_{RB})$ is an RB- or RB bundling-based random precoding matrix of size $N_b \times v$ and cyclically selected among the precoder elements in the $W_2$ codebook. $W_1$ can be fed back by a UE for semi-open-loop MIMO operation or may be randomly selected from the predetermined codebook set when open-loop MIMO is configured without PMI feedback.

In a second proposed scheme for UE-RS-based open-loop spatial multiplexing (Scheme 2), a modified large delay CDD precoding may be implemented by using a different beamformer for UE-RS and data transmissions. That is, for UE-RS, a per RB or per RB bundling-based random beamforming $W(i_{RB})$ may be applied. For the data symbols in PDSCH, the $W(i_{RB})$, D(i), and U matrices may be used for precoding. The CDD matrix D(i) may change from data resource element (RE) subcarrier to subcarrier, similar to the operational characteristics of transmission mode 3 (TM3). Scheme 2 may be described according to the following:

$$\begin{bmatrix} y_p^{(0)}(i) \\ \vdots \\ y_p^{(P-1)}(i) \end{bmatrix} = W(i_{RB}) \begin{bmatrix} x_p^{(0)}(i) \\ \vdots \\ x_p^{(v-1)}(i) \end{bmatrix}$$

for UE-RS, and $$\begin{bmatrix} y_d^{(0)}(i) \\ \vdots \\ y_d^{(P-1)}(i) \end{bmatrix} = W(i_{RB}) D(i) U \begin{bmatrix} x_d^{(0)}(i) \\ \vdots \\ x_d^{(v-1)}(i) \end{bmatrix}$$

for data. Similar to Scheme 1, Scheme 2 may also be extended to a dual codebook with $W(i_{RB}) = W_1 W_2(i_{RB})$, where $W_1$ is long-term wideband precoding matrix of size $P \times N_b$ and $W_2(i_{RB})$ is an RB- or RB bundling-based random precoding matrix of size $N_b \times v$ and cyclically selected among the precoder elements in the $W_2$ codebook. $W_1$ may be fed back by the UE for semi-open-loop MIMO operation or randomly selected from the predetermined wideband codebook set when open-loop MIMO is configured without PMI feedback.

For Scheme 1, a larger bandwidth may be used in order to achieve sufficient frequency selectivity by random precoding $W(i_{RB})$ while a small/medium bandwidth allocation may achieve limited diversity gain. Compared to Scheme 1, increased frequency selectivity can be observed in Scheme 2 due to the diversity effect of the CDD matrix, D(i). However, for RBs in the same bundling set, the frequency selectivity would be achieved by cycling over the v precoder elements using the CDD matrix, D(i). A question may arise whether there is performance degradation when combining the large delay CDD precoding with dual codebook structure based $W(i_{RB})$. For example, dual codebook based $W(i_{RB})$ can be given by:

$$W(i_{RB}) = \frac{1}{\sqrt{2}} \begin{bmatrix} u_1 & u_2 \\ e^{j\phi} u_1 & -e^{j\phi} u_2 \end{bmatrix}$$

for v=2, and $$W(i_{RB}) = \frac{1}{\sqrt{2}} \begin{bmatrix} u_1 & u_1 & u_2 & u_2 \\ e^{j\phi} u_1 & -e^{j\phi} u_1 & e^{j\phi} u_2 & -e^{j\phi} u_2 \end{bmatrix}$$

for v=4, where $e^{j\Phi} = 1$ or j, $u_1$ and $u_2$ are DFT precoding vectors selected from the $W_1$ codebook set.

If the D(i) and the U matrices are defined similarly to the 2/4 CRS ports in TM3, the combined precoder for data symbols may be represented as:

$$W = \begin{bmatrix} \frac{u_1 + u_2}{2} & \frac{u_1 - u_2}{2} \\ e^{j\phi} \frac{u_1 - u_2}{2} & e^{j\phi} \frac{u_1 + u_2}{2} \end{bmatrix}$$

for v=2, and $$W = \begin{bmatrix} \frac{u_1 + u_2}{\sqrt{2}} & \frac{u_1 - u_2}{2} & 0 & \frac{u_1 - u_2}{2} \\ 0 & je^{j\phi} \frac{u_1 - u_2}{2} & \frac{u_1 + u_2}{\sqrt{2}} & -je^{j\phi} \frac{u_1 - u_2}{2} \end{bmatrix}$$

for v=4. For each v continuous subcarriers, the eNB cyclically assigns the v data symbols to the v beams formed by the combined precoding matrix W. The benefit of the CDD precoding may be reduced, however, by correlation of the two DFT vectors $u_1$ and $u_2$, and the data transmission from one polarization instead of two polarizations may not fully utilize the spatial diversity of the channel.

Figure 4:
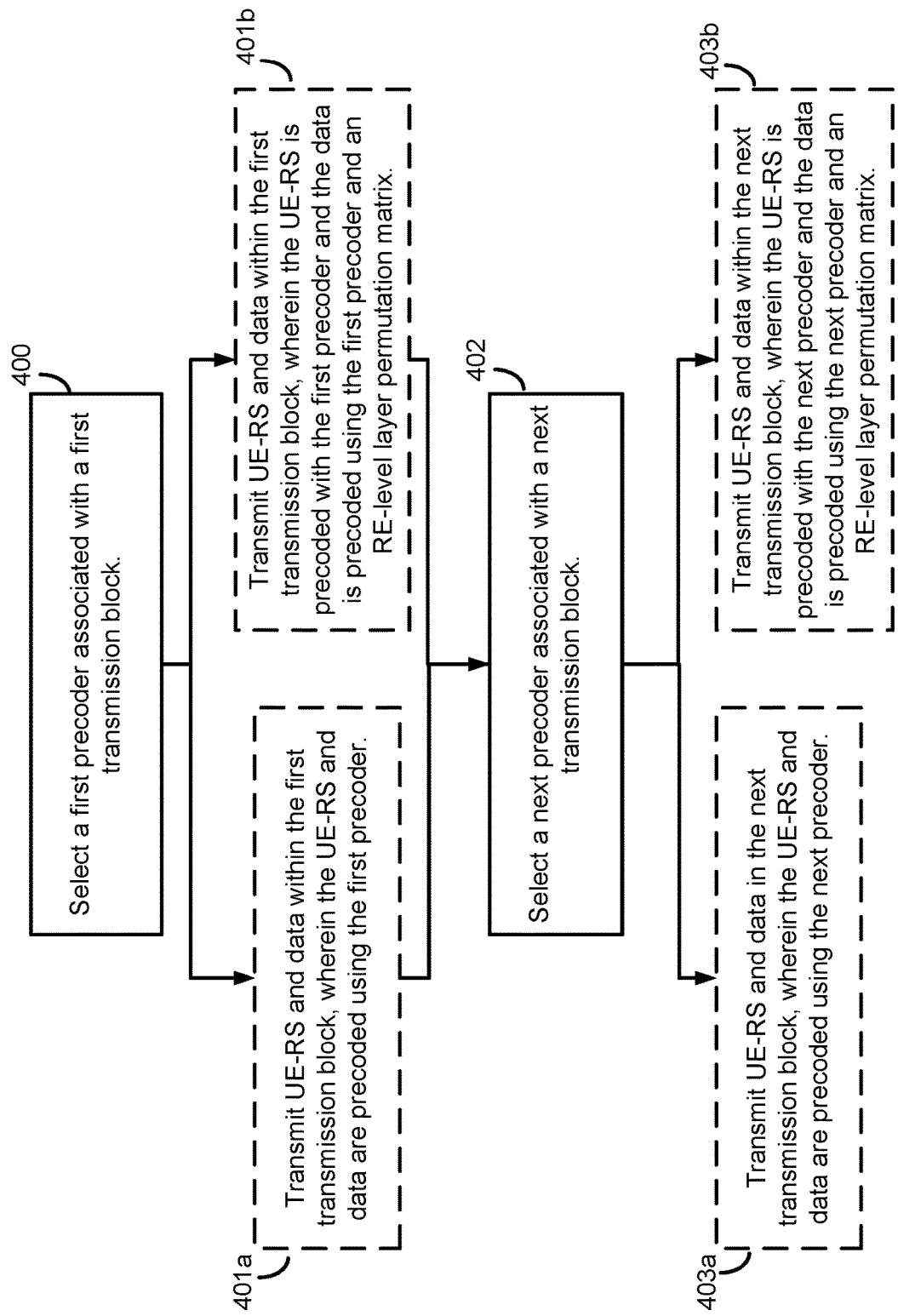
FIG. 4 is a block diagram illustrating example blocks executed to implement one aspect of the present disclosure.
Figure 12:
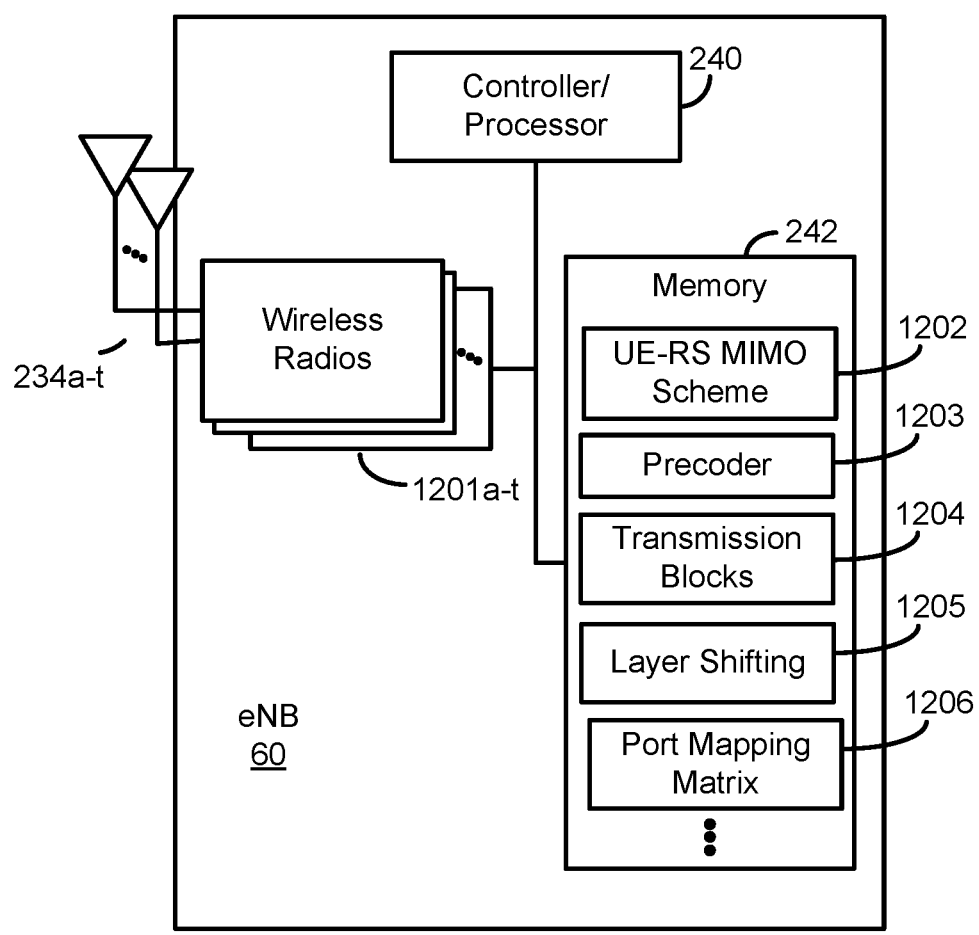
FIG. 12 is a block diagram illustrating an eNB configured according to one aspect of the present disclosure.

FIG. 4 is a block diagram illustrating example blocks executed to implement one aspect of the present disclosure. The example blocks of FIG. 4 define an improvement to Scheme 1 of the UE-RS based open-loop and semi-open-loop spatial multiplexing. The example blocks will also be described with respect to eNB 60 as illustrated in FIG. 12. FIG. 12 is a block diagram illustrating eNB 60 configured according to one aspect of the present disclosure. eNB 60 includes the structure, hardware, and components as illustrated for UE 105 of FIG. 2. For example, eNB 60 includes controller/processor 240, which operates to execute logic or computer instructions stored in memory 242, as well as controlling the components of eNB 60 that provide the features and functionality of eNB 60. eNB 60, under control of controller/processor 240, transmits and receives signals via wireless radios 1201a-t and antennas 234a-t. Wireless radios 1201a-t includes various components and hardware, as illustrated in FIG. 2 for eNB 105, including modulator/demodulators 232a-t, MIMO detector 236, receive processor 238, transmit processor 220, and TX MIMO processor 230.

At block 400, an eNB selects a first precoder associated with a first transmission block. For example, eNB 60, under control of controller/processor 240, executes UE-RS MIMO scheme 1202 stored in memory 242. The execution environment of executing UE-RS MIMO scheme 1202 determines whether the improved aspects of Scheme 1 or Scheme 2 are implemented by eNB 60. In further execution by controller/processor 240 of transmission block 1204, eNB 60 may define a transmission block as a RB or a set of bundled RBs, or, in additional aspects of the present disclosure, a transmission block may also be a sub-RB. A sub-RB is a selection of contiguous REs within a RB. Each RB may include multiple sub-RB groups selected with different contiguous REs across subcarriers, OFDM symbols, or a combination of both. The sub-RB based transmission block operation may be used for a small size resource allocation (e.g., one or a limited # of RBs). The threshold for selecting such a sub-RB scheme may be hard-coded, RRC configured, or even indicated in DCI. The selecting performed by the eNB in accordance with the example aspect may be random, weighted, or the like.

In a first example aspect illustrated in FIG. 4 and defined with a sub-RB-based transmission block, at block 401a, the eNB transmits UE-RS and data within the first transmission block, wherein the UE-RS and data are precoded using a first precoder. The UE-RS and data are precoded through execution of precoder 1203, stored in memory 242, into the selected group of contiguous REs of the RB. Depending on the particular aspect of Scheme improvement under operation, eNB 60 knows whether to precode both UE-RS and data using the same precoders, or to use different precoding for UE-RS and data.

At block 402, the eNB selects a next precoder associated with a next transmission block. For example, the execution environment of UE-RS MIMO scheme 1202 and precoder 1203 direct eNB 60 to select the appropriate beamformer. Moreover, by the execution environment of transmission block 1204 under control of controller/processor 240, defining the transmission blocks on a sub-RB basis, the precoder, $W(i_{sub\_RB})$, may change in each sub-RB group. Multiple different precoders may be used in transmission of UE-RS and data within the same RB, thus, improving diversity even in small or medium bandwidth allocations of Scheme 1.

In the first example aspect defined with the sub-RB-based transmission blocks, at block 403a, the eNB transmits UE-RS and data in the next transmission block, wherein the UE-RS and data are precoded using the next precoder. The UE-RS and data are transmitted via wireless radios 1201a-t and antennas 234a-t. The random precoding of blocks 401a and 403a through execution of precoder 1203 may be extended also to a dual codebook, with $W(i_{sub\_RB})=W_1 W_2(i_{sub\_RB})$, where $W_1$ is a long-term wideband precoding matrix and $W_2(i_{sub\_RB})$ is a sub-RB-based random precoding matrix that is cyclically selected from the predetermined set of precoder elements in the $W_2$ codebook. $W_1$ can be fed back by a UE when configured for semi-open-loop MIMO operation or may be randomly selected from the predetermined codebook set when open-loop MIMO is configured without PMI feedback.

Figure 5A:
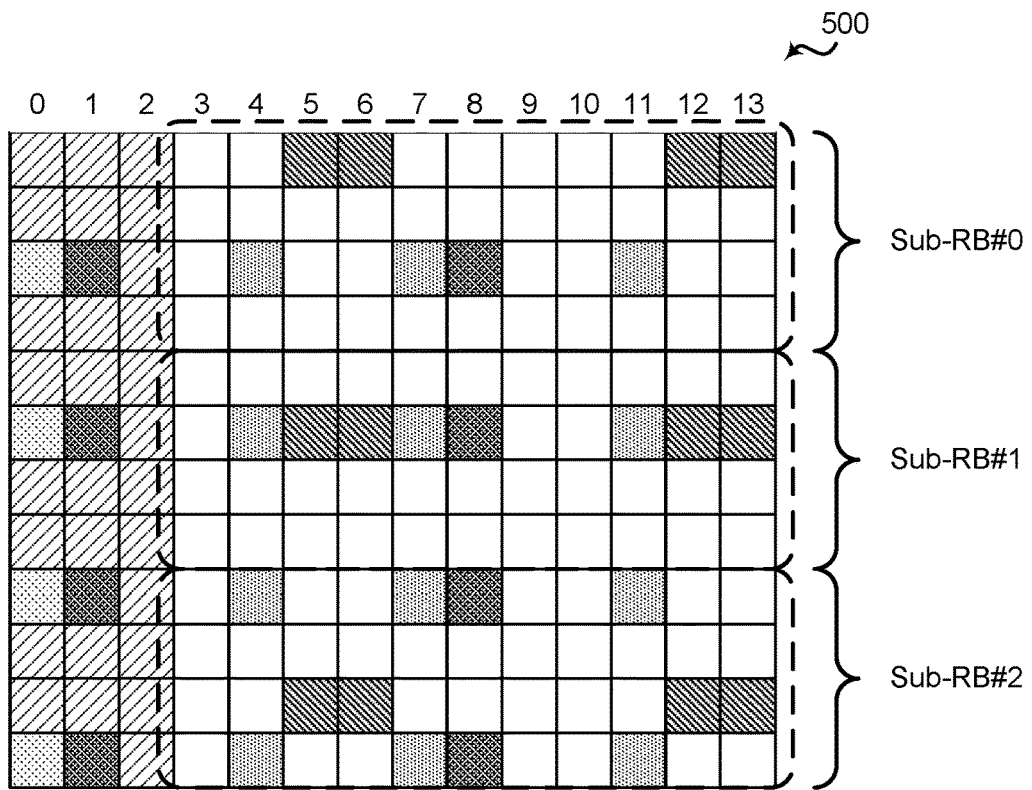
FIGS. 5A and 5B are block diagrams illustrating resource blocks having sub-RB-based transmission blocks according to aspects of the present disclosure.
Figure 5B:
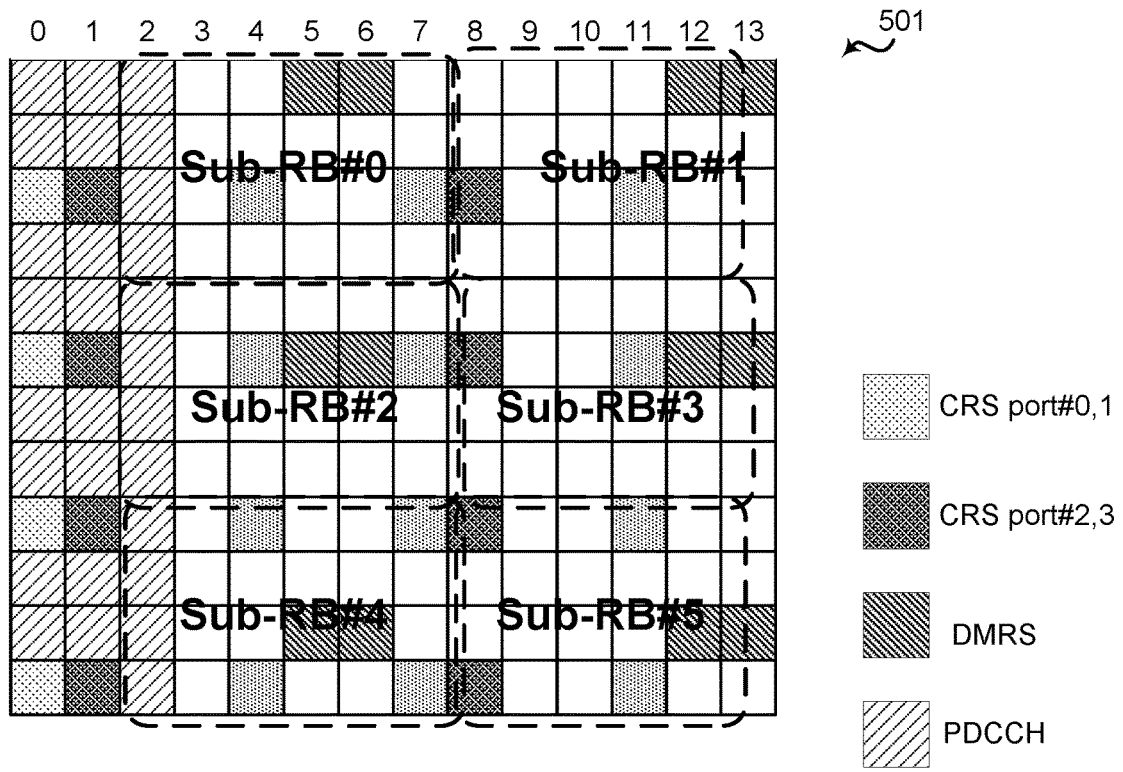

FIGS. 5A and 5B are block diagrams illustrating resource blocks 500 and 501 having sub-RB-based transmission blocks according to aspects of the present disclosure. The performance of Scheme 1 with small/medium BW allocation can be improved by using a sub-RB level precoding bundling according to the various aspects of the present disclosure. As shown resource block 500 in the FIG. 5A, the 12 UE-RS tones per RB are divided into three frequency division multiplex (FDM) groups, each associated with one sub-RB transmission block, Sub-RB #0, Sub-RB #1, and Sub-RB #2. The random precoding is applied within each sub-RB transmission block and the precoder may change across the sub-RBs. That is:

$$\begin{bmatrix} y^{(0)}(i) \\ \vdots \\ y^{(P-1)}(i) \end{bmatrix} = W(i_{sub\_RB}) \begin{bmatrix} x^{(0)}(i) \\ \vdots \\ x^{(v-1)}(i) \end{bmatrix} \quad (3)$$

The partition of one RB into multiple sub-RBs may include other options, such as illustrated by resource block 501 in FIG. 5B, in which case the sub-RB transmission blocks have staggered grouping. For example, resource block 501 is divided into six sub-RB-based transmission blocks, Sub-RB #0-Sub-RB #5.

It should be noted that various additional aspects of the present disclosure provide that downlink resource allocation may also be changed from a per-RB to a per-sub-RB basis.

Referring back to FIG. 4, in an additional example aspect of the present disclosure, after randomly selecting the first precoder, through the execution environment of precoder 1203, and associated with the first transmission block at block 400, the eNB may transmit UE-RS and data within the first transmission block via wireless radios 1201a-t and antennas 234a-t, wherein the UE-RS is precoded by executing precoder 1203 using the first precoder and the data is precoded by executing precoder 1203 using the first precoder and an RE-level layer permutation matrix stored at layer shifting matrix 1205, at alternative block 401b. Instead of precoding the data with only the first precoder, as illustrated in block 401a, alternative block 401b allows additional precoding of the data with the layer permutation matrix at layer shifting matrix 1205, which, when executed under control of controller/processor 240 that causes the data to be shifted by layers within the transmission channel via wireless radios 1201a-t and antennas 234a-t.

To achieve the RE-level precoder cycling described in alternative block 401b, Scheme 1 may be modified as follows:

$$\begin{bmatrix} y_p^{(0)}(i) \\ \vdots \\ y_p^{(P-1)}(i) \end{bmatrix} = W(i_{RB}) \begin{bmatrix} x_p^{(0)}(i) \\ \vdots \\ x_p^{(v-1)}(i) \end{bmatrix}$$

for UE-RS transmission, and $$\begin{bmatrix} y_d^{(0)}(i) \\ \vdots \\ y_d^{(P-1)}(i) \end{bmatrix} = W(i_{RB})U(i) \begin{bmatrix} x_d^{(0)}(i) \\ \vdots \\ x_d^{(v-1)}(i) \end{bmatrix}$$

for data transmission. Where the matrix U(i) is an RE-level layer permutation matrix stored at layer shifting matrix 1205 in memory 242 that cyclically assigns the v beams formed by the matrix $W(i_{RB})$ to different layers within v continuous subcarriers. Examples of the layer permutation matrix U(i) for v=4 include the following:

$U(0)=[e_1 e_2 e_3 e_4]$, $U(1)=[e_4 e_1 e_2 e_3]$, $U(2)=[e_3 e_4 e_1 e_2]$, $U(3)=[e_2 e_3 e_4 e_1]$, where $e_i$ is a basis vector with '1' on $i^{th}$ element and '0' on all other elements. The random precoder $W(i_{RB})$ may change across RBs, across sets of bundled RBs, or across sub-RB transmission blocks based on the configuration and $W(i_{RB})=W_1W_2(i_{RB})$ for dual codebook structure.

After selecting the next precoder associated with the next transmission block at block 402, the eNB, in the additional example illustrated in FIG. 4, would transmit the UE-RS and data, at block 403b, within the next transmission block, wherein the UE-RS is precoded with the next precoder, while the data is again precoded not only with the next precoder but also using the RE-level layer permutation matrix, U(i).

FIGS. 6A and 6B are block diagrams illustrating transmission streams 600 and 601 of eNB 60 configured according to aspects of the present disclosure. In FIG. 6A, eNB 60 transmits data without RE-level layer shifting, while, in FIG. 6B, eNB 60 uses random precoding with RE-level layer shift for data transmission. P7, P8, P9 and P10 are precoders for UE-RS port 7, 8, 9 and 10, while X0, X1, X2 and X3 are data symbols of the layers 0, 1, 2 and 3. Without RE-level layer shift, as illustrated in transmission stream 600, eNB 60 uses the same precoder for the data symbols in four continuous subcarriers in which the diversity is obtained through the beamformer changing across RBs. With RE-level layer shift, as illustrated in transmission stream 601, eNB 60 cyclically assigns the four precoders to four layers for every four continuous subcarriers and RE-level frequency selectivity is achieved. With the layer shift, two codewords experience the same effective channel SINR for rank >1 and CQI averaging may be achieved across all layers.

Figure 7:
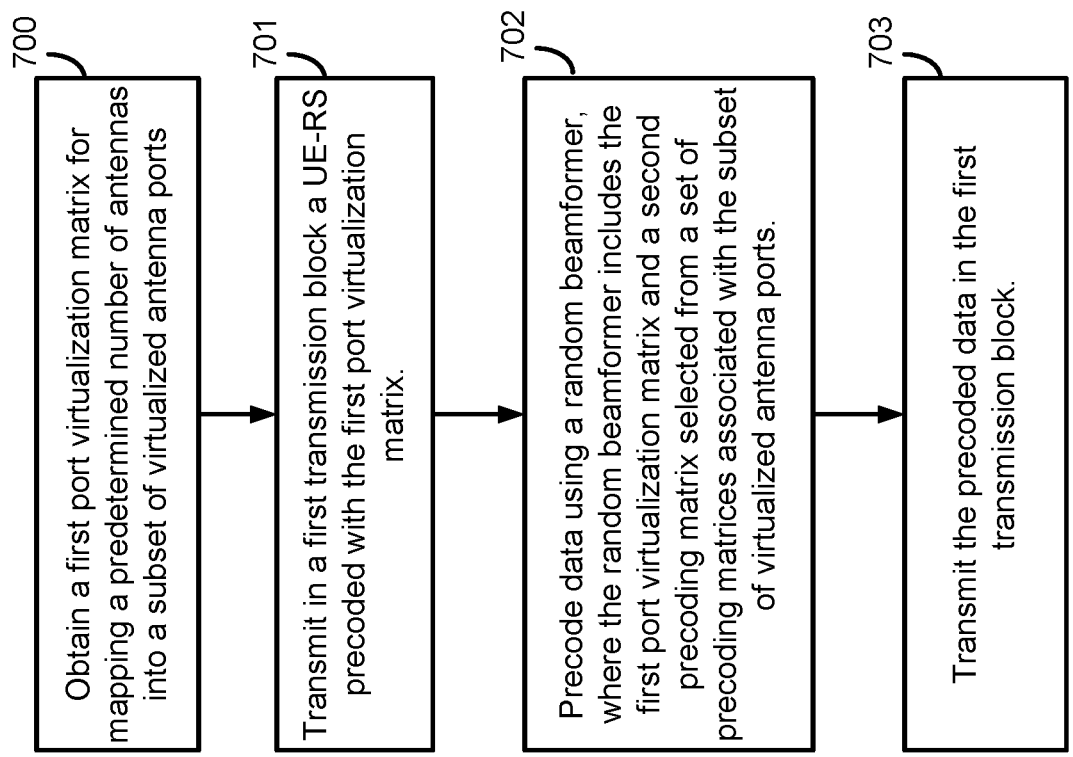
FIG. 7 is a block diagram illustrating example blocks executed to implement one aspect of the present disclosure.

FIG. 7 is a block diagram illustrating example blocks executed to implement one aspect of the present disclosure. At block 700, an eNB obtains a first port virtualization matrix for mapping a predetermined number of antennas into a subset of virtualized antenna ports. At block 701, the eNB transmits in a first transmission block a UE-RS precoded by executing precoder 1203 with the port virtualization matrix 1206 stored in memory 242. According to additional aspects of the present disclosure, a modified Scheme 2 uses the RE-level random precoding from precoder 1203 for increased frequency selectivity according to the following:

$$\begin{bmatrix} y_p^{(0)}(i) \\ \vdots \\ y_p^{(P-1)}(i) \end{bmatrix} = W_1(i_{RB}) \begin{bmatrix} x_p^{(0)}(i) \\ \vdots \\ x_p^{(v-1)}(i) \end{bmatrix}$$

for UE-RS precoding and transmission. Where $W_1(i_{RB})$ is a port virtualization matrix 1206 with an orthogonal column vector which maps P antennas into 2 or 4 virtualized ports. $W_1(i_{RB})$ may be used to precode UE-RS and may change on per RB or per RB bundling or a per-sub-RB basis. $W_1(i_{RB})$, can be constructed from a set of orthogonal DFT basis vector, e.g., $$W_1 = \begin{bmatrix} u_1 & 0 \\ 0 & u_1 \end{bmatrix}$$

for 2-ports and $$W_1 = \begin{bmatrix} u_1 & u_1 & 0 & 0 \\ 0 & 0 & u_2 & u_2 \end{bmatrix}$$

for 4-ports, where $u_1$ and $u_2$ are the DFT vectors from the $W_1$ codebook set.

At block 702, the eNB precode data by executing precoder 1203, under control of controller/processor 240, using a random beamformer, where the random beamformer includes the first port virtualization matrix and a second precoding matrix selected from a set of precoding matrices associated with the subset of virtualized antenna ports, from UE-RS MIMO scheme 1202 and precoder 1203, and, at block 703, the eNB transmits the precoded data in the first transmission block via wireless radios 1201a-t and antennas 234a-t. The modified Scheme 2 uses RE-level random precoding for increased frequency selectivity further according to the following:

$$\begin{bmatrix} y_d^{(0)}(i) \\ \vdots \\ y_d^{(P-1)}(i) \end{bmatrix} = W(i)D(i)U \begin{bmatrix} x_d^{(0)}(i) \\ \vdots \\ x_d^{(v-1)}(i) \end{bmatrix}$$

for data precoding and transmission. For data symbols, the random beamformer $W(i)=W_1(i_{RB})W_2(i)$, where $W_2(i)$ is selected from the 2Tx/4Tx codebook of size 2×v or 4×v.

Additional aspects of the present disclosure provide that rank 1 transmissions with transmit diversity of two layers may be extended to UE-RS-based operations using space frequency block coding (SFBC). For transmission on two UE-RS ports, $p \in \{7,8\}$, the precoding for PDSCH is defined by:

$$\begin{bmatrix} y^{(0)}(2i) \\ y^{(1)}(2i) \\ y^{(0)}(2i+1) \\ y^{(1)}(2i+1) \end{bmatrix} = \begin{bmatrix} W(i) & 0 \\ 0 & W(i) \end{bmatrix} \cdot T \cdot \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix}$$

-continued $$T = \begin{bmatrix} 1 & 0 & j & 0 \\ 0 & -1 & 0 & j \\ 0 & 1 & 0 & j \\ 1 & 0 & -j & 0 \end{bmatrix}$$

Where the matrix T is precoding matrix for 2-ports T×D, as defined for CRS based transmit diversity. W(i) is an antenna port virtualization matrix of size P×2, which can be the same beamformer used for rank 2 open-loop spatial multiplexing: W(i) W($i_{RB}$) $W_1W_2(i_{RB})$, for sub-RB-based, RB-based, or RB bundling-based random precoding (Scheme 1), or W(i)= $W_1(i_{RB})W_2(i)$ for RE-level based random precoding (Scheme 2). For UE-RS, a per sub-RB based or RB bundling based random precoding W($i_{RB}$)=$W_1W_2(i_{RB})$ (Scheme 1), or $W_1(i_{RB})$ (Scheme 2) may be applied.

Figure 8:
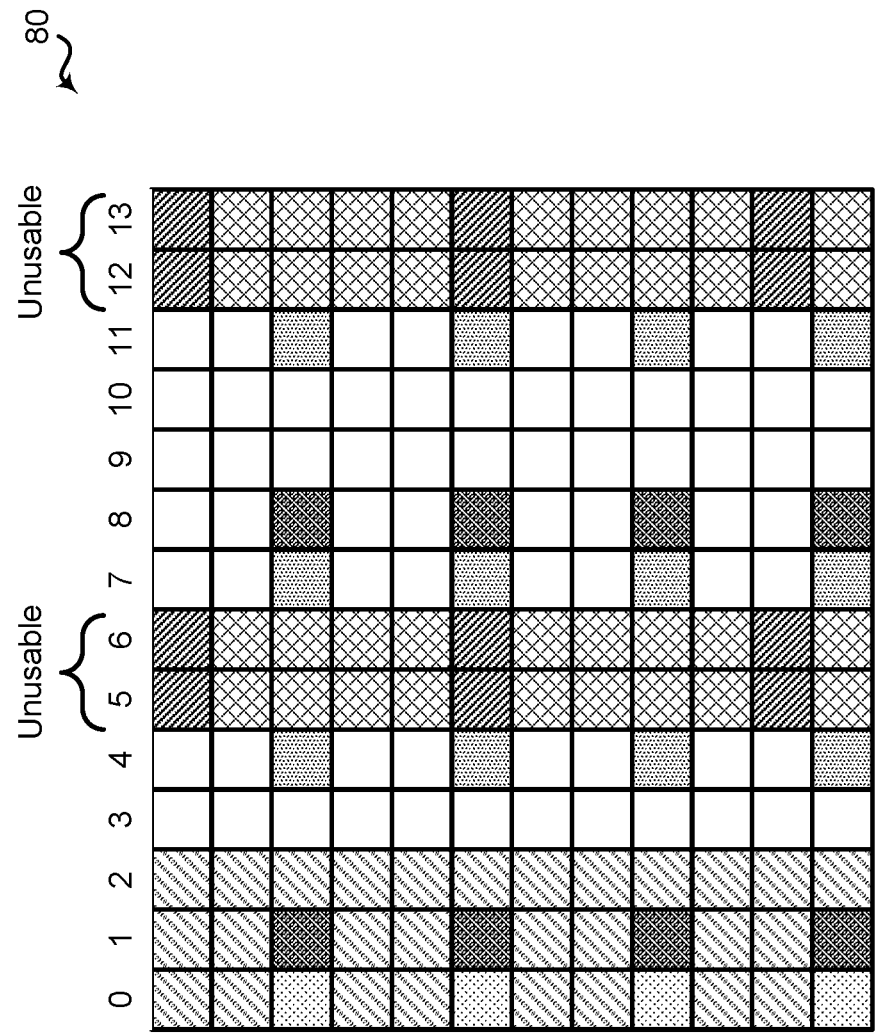
FIG. 8 is a block diagram illustrating a resource block considered for UE-RS based open-loop or semi-open-loop MIMO with SFBC block coding.
Figure 8:
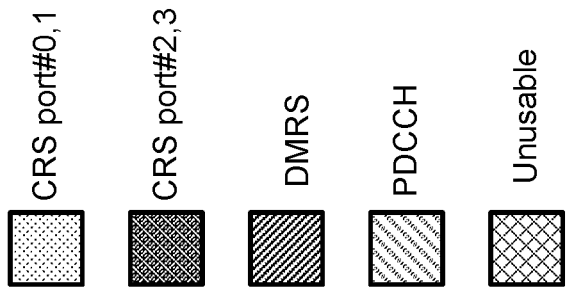

FIG. 8 is a block diagram illustrating a resource block 80 considered for UE-RS based open-loop or semi-open-loop MIMO with SFBC block coding. In currently specified system, an SFBC block, e.g. two REs may not span across different OFDM symbols, or across more than three subcarriers in the frequency domain, or across two RBs. If there is an odd number of available PDSCH REs in a PRB, as in resource block 80, the symbol of the entire RB is skipped. Following same principle for UE-RS based transmit diversity, for rank 1-2 transmissions on two UE-RS ports, the symbols 5, 6, 12 and 13 are unusable for PDSCH transmission which may greatly reduce the peak throughput.

Figure 9:
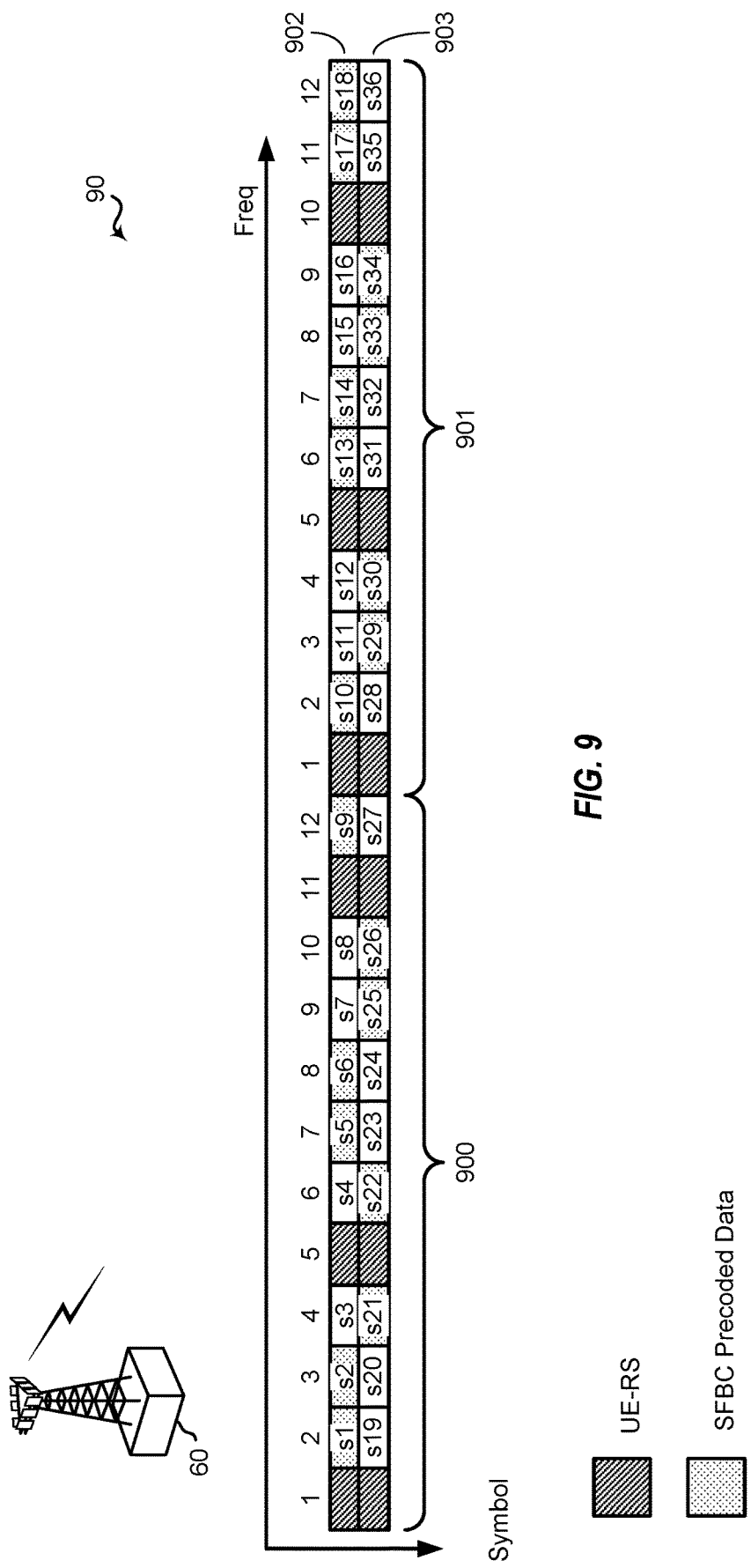
FIG. 9 is a block diagram illustrating an eNB configured according to one aspect of the present disclosure for mapping an SFBC block across two RBs in the same bundling RB set.

FIG. 9 is a block diagram illustrating eNB 60 configured according to one aspect of the present disclosure for mapping an SFBC block across two RBs 900 and 901 in the same bundling RB set 90. Because RB bundling may be applied for UE-RS, the above SFBC block mapping restrictions can be relaxed so that an SFBC block can be mapped across two RBs 900 and 901 in the same bundling set 90 if there is an even number of resource elements for the OFDM symbol containing UE-RS in two continuous resource blocks assigned for transmission. For example, in OFDM symbols 902 and 903, there are an even number of resource elements in the two continuous resource blocks 900 and 901 assigned for transmission.

It should be noted that the sub-RB bundling operation for improvements to Scheme 1 is used for a small size resource allocation (e.g., one or a limited number of RBs). The threshold for choosing such a sub-RB scheme may be hard-coded in a UE, RRC configured, or even indicated in downlink control information (DCI).

Figure 10:
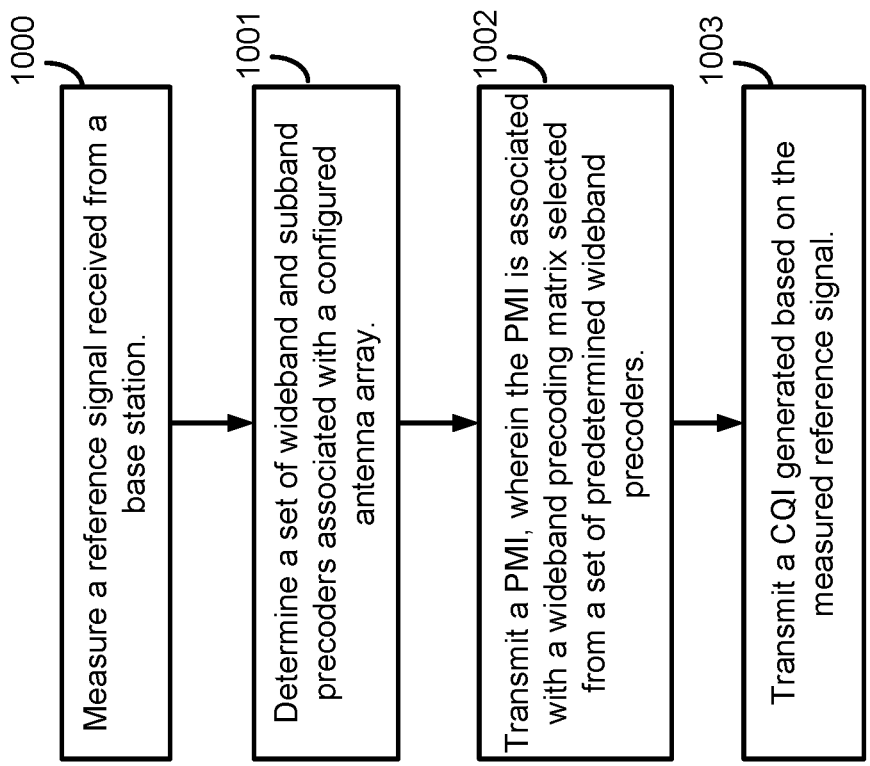
FIG. 10 is a block diagram illustrating example blocks executed to implement one aspect of the present disclosure for semi-open-loop MIMO.
Figure 13:
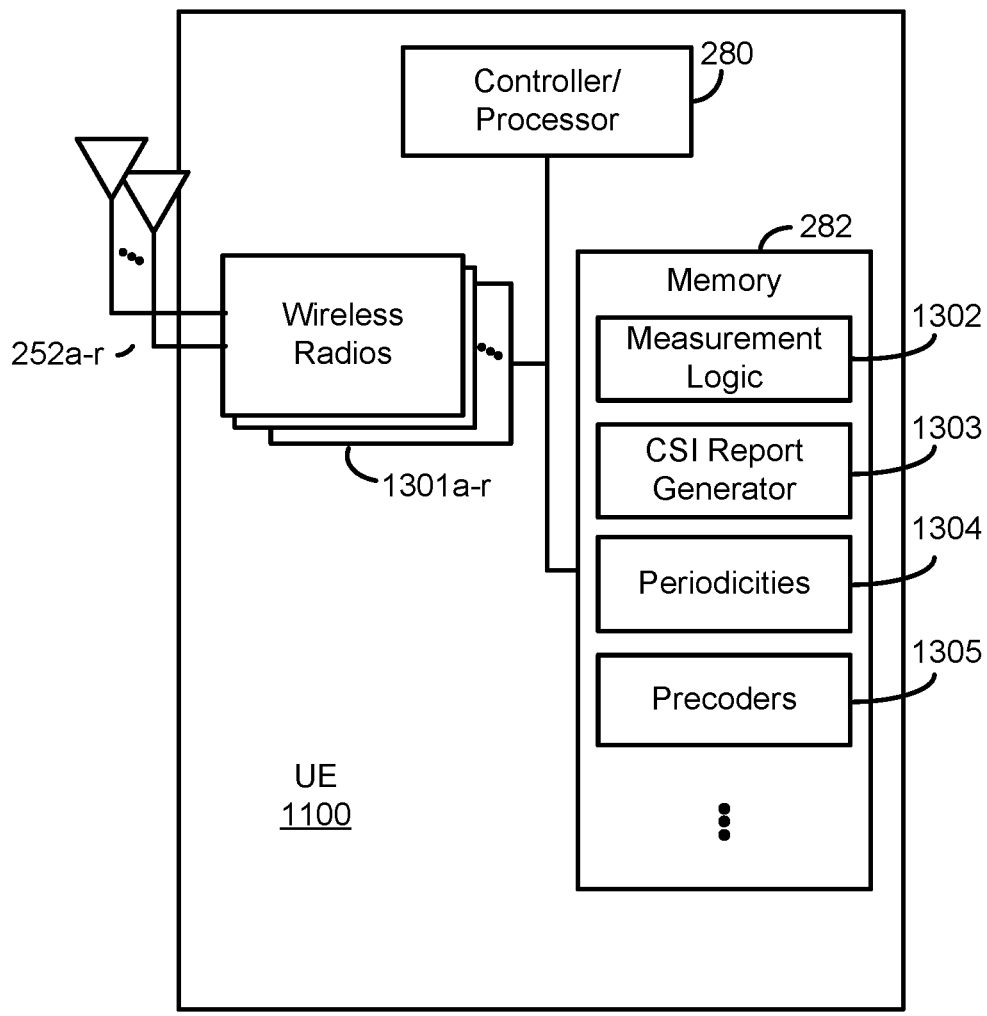
FIG. 13 is a block diagram illustrating a UE configured according to one aspect of the present disclosure.

FIG. 10 is a block diagram illustrating example blocks executed to implement one aspect of the present disclosure for semi-open-loop MIMO. The example blocks of FIG. 10 will also be described with respect to UE 1100 as illustrated in FIG. 13. FIG. 13 is a block diagram illustrating UE 1100 configured according to one aspect of the present disclosure. UE 1100 includes the structure, hardware, and components as illustrated for UE 115 of FIG. 2. For example, UE 1100 includes controller/processor 280, which operates to execute logic or computer instructions stored in memory 282, as well as controlling the components of UE 1100 that provide the features and functionality of UE 1100. UE 1100, under control of controller/processor 280, transmits and receives signals via wireless radios 1301a-r and antennas 252a-r. Wireless radios 1301a-r includes various components and hardware as illustrated in FIG. 2 for UE 115, including demodulator/modulators 254a-r, MIMO detector 256, receive processor 258, transmit processor 264, and TX MIMO processor 266.

At block 1000, a UE measures a reference signal received from a base station. For example, UE 1100 executes measurement logic 1302, stored in memory 282, under control of controller/processor 280. At block 1001, the UE determines a set of wideband and subband precoders associated with a configured antenna array. For example, UE 1100, under control of controller/processor 280, determines the set of wideband and subband precoders within the execution environment of measurement logic 1302 and by accessing precoders 1305, stored in memory 282, for the configured antenna array of antennas 252a-r.

At block 1002, the UE transmits a PMI via wireless radios 1301a-r, and antennas 252a-r, wherein the PMI is associated with a wideband precoding matrix selected from a set of predetermined wideband precoders associated with a configured antenna array. The reported PMI, which may be constrained by the reported RI, indicates the first PMI of the dual codebook.

At block 1003, the UE transmits a CQI generated based on the measured reference signal, wherein the CQI is generated according to an assumption that precoder elements are cycled from a set of predetermined subband precoders. The predetermined subband precoders includes the $W_2$ codebook associated with the first PMI. The CQI can be either wideband or subband based on the configuration.

For a rank >1, one CQI is reported for two codewords since the two codewords may experience the same effective channel quality due to the usage of RE-level layer shifting for data transmission.

It should be noted that when the first precoding matrix of the associated codebook is an identity matrix, the UE may skip reporting the PMI. Additionally, when the PMI is not reported, the CQI may be generated according to an assumption that precoder elements are cycled from a set of predetermined wideband precoders.

Figure 11A:
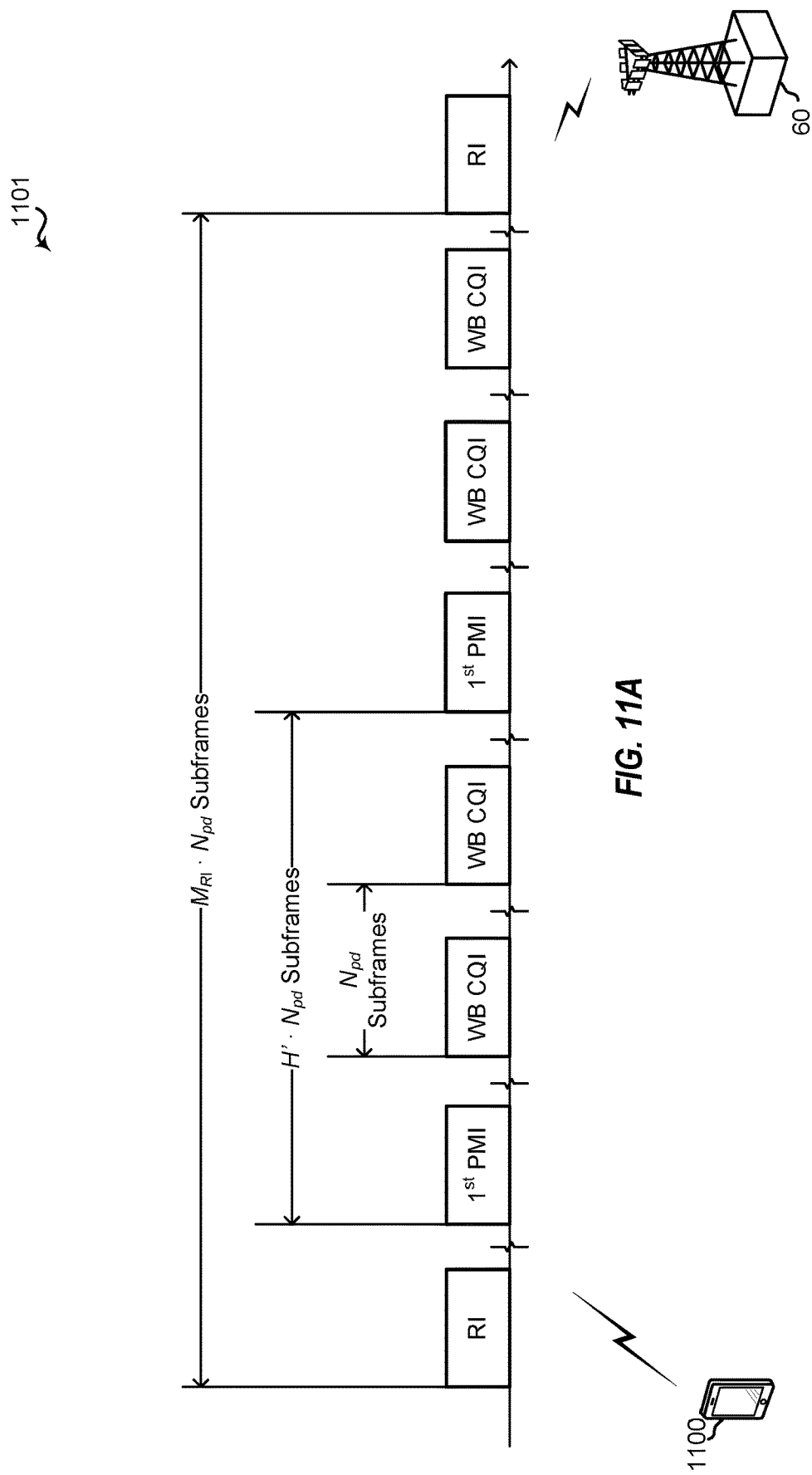
FIG. 11A is a block diagram illustrating a UE and eNB configured according to one aspect of the present disclosure.

FIG. 11A is a block diagram illustrating a UE 1100 and eNB 60 configured according to one aspect of the present disclosure. In the example illustrated in FIG. 11A, UE 1100 is configured to transmit CSI reporting 1101 for PUCCH Mode 1-1. UE 1100 send eNB 60 the first CSI report via wireless radios 1301a-r and antennas 252a-r, including RI, the second report including the first PMI, and the third report including a wideband CQI. It should be noted that the period of the third wideband CQI report may be $N_{pd}$ subframes, while the period of the first and second reports may be $M_{RI}$ $N_{pd}$ and H' $N_{pd}$ subframes. $M_{RI}$, $N_{pd}$ and H' may be configured by the higher-layer signaling from eNB 60 and stored at periodicities 1304 in memory 282. The second and third reports are configured with the same reporting subframe offset which can be different from that of the first report. UE 1100, under control of controller/processor 280, will access the periodicities and offsets stored in periodicities 1304 when executing the CSI report generator 1303 to generate and send out the CSI reports.

Figure 11B:
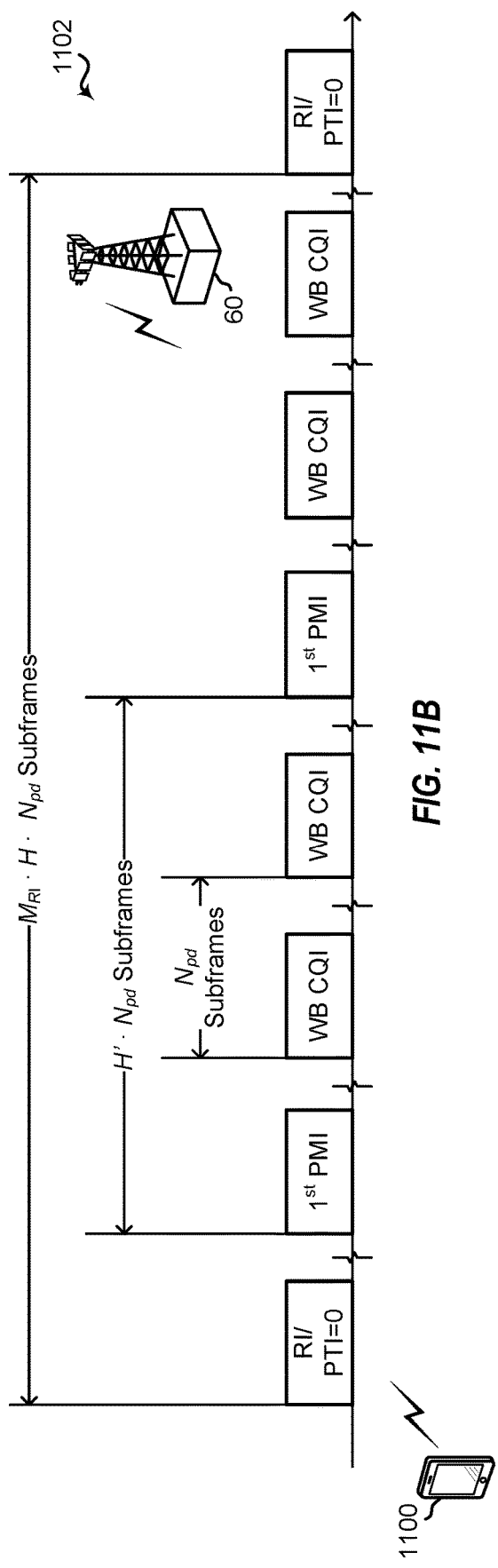
FIGS. 11B and 11C are block diagrams illustrating CSI reporting between UE and eNB configured according to aspects of the present disclosure.
Figure 11C:
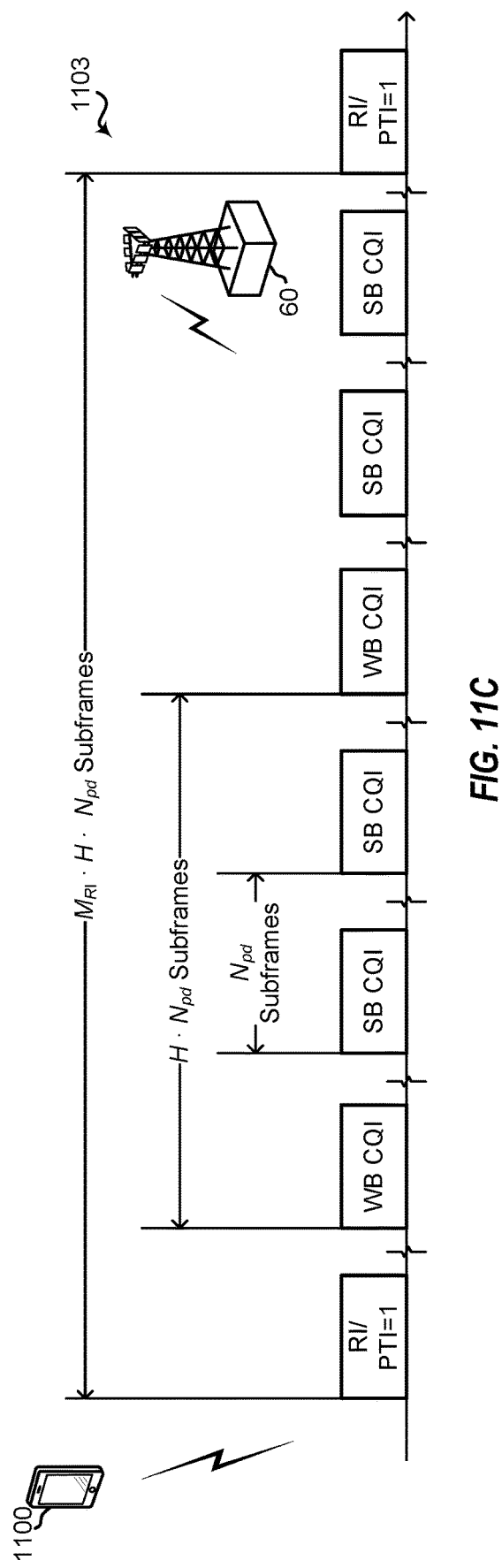

FIGS. 11B and 11C are block diagrams illustrating CSI reporting 1102 and 1103 between UE 1100 and eNB 60 configured according to aspects of the present disclosure. For PUCCH Mode 2-1, UE 1100 sends eNB 60 the first report including RI and precoding type indicator (PTI), the second report including the first PMI for PTI=0, CSI reporting 1102, and wideband CQI for PTI=1, CSI reporting 1103, and the third report including wideband CQI for PTI=0, CSI reporting 1102, and subband CQI for PTI=1, CSI reporting 1103. It should be noted that the period of the third report may be $N_{pd}$ subframes. The period of the second report may be $H \cdot N_{pd}$ subframes for first PMI (PTI=0), CSI reporting 1102, or $H \cdot N_{pd}$ subframes for wideband CQI (PTI=1), CSI reporting 1103. The period of the first report may be $M_{RI} \cdot H \cdot N_{pd}$ subframes.

The open loop transmission schemes and associated UE-RS ports and layers are indicated by layer 1 (L1) signaling, as shown in Table 1 below, assuming total single user/multiple user layers no larger than four. When only one codeword is enabled, the first four code points with the value 0-3 are used to indicate the rank 1 transmission with single antenna port mapping. It can be used for both single user/multiple user transmission. For multiple user transmission, different UEs can be distinguished by different UE-RS ports or by a scrambling identity of 0 and 1. For the next two code points with a value of 4 and 5 for one codeword case, it may be associated with a rank 1 transmission having transmit diversity with UE-RS ports 7-8 assigned. For the value of 6 of one codeword case, it may be used for retransmission when the associated transport block is mapped to 2 layers in the initial transmission. When both of the two codewords are enabled, the first code points with a value of 0 and 1 are used for rank 2 spatial multiplexing transmission with UE-RS ports 7-8. For rank 3 transmission, there may be two configurations, one for UE-RS ports 7-9 and the other for UE-RS ports 7-10. The first may be associated with Scheme 1 and the second may be associated with Scheme 2, where four virtualized ports may be used. For rank 4 transmission, UE-RS ports 7-10 may be used. It should be noted that the definition of UE-RS ports 7, 8, 9 and 10 may be same as that used for close-loop beamforming, e.g., based on an orthogonal cover code of length 2.

TABLE 1

| One codeword: codeword 0 enabled, codeword 1 disabled | | Two codewords: codeword 0 enabled, codeword 1 enabled | |
|---|---|---|---|
| Value | Message | Value | Message |
| 0 | 1 layer, port 7, $n_{SCID} = 0$ | 0 | 2 layers, ports 7-8 $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 3 layers, ports 7-9 |
| 4 | 2 layers, TxD, ports 7-8 $n_{SCID} = 0$ | 4 | 4 layers, ports 7-10 |
| 5 | 2 layers, TxD, ports 7-8 $n_{SCID} = 1$ | 5 | Reserved |
| 6 | 2 layers, SM, ports 7-8 | 6 | Reserved |
| 7 | Reserved | 7 | Reserved |

Those of skill in the art would understand that various aspects of the present disclosure may include different implementations, such as through non-transitory computer-readable media, which, when code stored thereon is executed by one or more computers or processors performs the features and functionality of the aspects, and such as through apparatuses that have one or more processors and memory coupled to the processors, such that when instructions are executed, the apparatus may be configured to perform the features and functionality of the aspects. The following aspects represent statements that reflect the various aspects of the present disclosure in different formats from the claims filed herewith.

The present disclosure comprises a first aspect, such as a non-transitory computer-readable medium having program code recorded thereon, the program code including:

program code for causing a computer to select a first precoder associated with a first transmission block, wherein the first transmission block includes one of: a first resource block, a first set of bundled resource blocks, or a first sub-resource block selected as a group of contiguous resource elements within a resource block;

program code for causing the computer to transmit user equipment (UE)-specific reference signals (UE-RS) and data within the first transmission block, wherein the UE-RS and data are precoded using the first precoder;

program code for causing the computer to select a next precoder associated with a next transmission block, wherein the next transmission block includes one of: a next resource block, a next set of bundled resource blocks, or a next sub-resource block selected as a next group of contiguous resource elements within the resource block; and program code for causing the computer to transmit the UE-RS and data in the next transmission block, wherein the UE-RS and data are precoded with a next precoder.

Based on the first aspect, the non-transitory computer-readable medium of a second aspect, wherein the first precoder and the next precoder are based on a product of a wideband precoding matrix and a subband precoding matrix, wherein the subband precoding matrix is cyclically selected from a set of predetermined precoding matrices.

Based on the second aspect, the non-transitory computer-readable medium of a third aspect, wherein the wideband precoding matrix is one of:
  received from a UE; or
  randomly selected from a set of predetermined wideband precoding matrices.

Based on the first aspect, the non-transitory computer-readable medium of a fourth aspect, wherein the program code for causing the computer to transmit the UE-RS and data are executed at rank >1, wherein the data is further precoded with a layer permutation matrix along with the first precoder and the next precoder; wherein the layer permutation matrix cyclically assigns each resulting transmission beam to a different layer within a predetermined number of continuous subcarriers.

Based on the first aspect, the non-transitory computer-readable medium of a fifth aspect, wherein the program code for causing the computer to transmit the UE-RS and data are executed at rank 1 and configured with transmit diversity, wherein the data is further precoded with a space frequency block coding matrix.

Based on the fifth aspect, the non-transitory computer-readable medium of a sixth aspect, further includes:
  program code for causing the computer to determine the first transmission block is the first set of bundled resource blocks;
  program code for causing the computer to determine presence of an even number of resource elements for the data in two continuous resource blocks of the first set of bundled resource blocks; and
  program code for causing the computer to map the data precoded with the space frequency block coding matrix across two continuous resource blocks of the first set of bundled resource blocks.

Based on the first aspect, the non-transitory computer-readable medium of a seventh aspect, further includes:
  program code for causing the computer to transmit an indication of transmission scheme, wherein the indication of transmission scheme is associated with at least one or more UE-RS ports, the number of useful layers, a mode of transmit diversity or spatial multiplexing for data transmission.

Based on the first aspect, the non-transitory computer-readable medium of an eighth aspect, further includes:
program code for causing the computer to determine the first transmission block and the next transmission block based on at least a total number of scheduled resource blocks, wherein a sub-resource block is selected only for a small size resource allocation.

The present disclosure comprises a ninth aspect which further comprises the non-transitory computer-readable medium of any combination the first through eighth aspects.

The present disclosure comprises a tenth aspect, such as a non-transitory computer-readable medium having program code recorded thereon, the program includes:
program code for causing a computer to obtain a first port virtualization matrix for mapping a predetermined number of antennas into a subset of virtualized antenna ports;
program code for causing the computer to transmit in a first transmission block a user equipment (UE)-specific reference signal (UE-RS) precoded with the first port virtualization matrix, wherein the first transmission block is one of: a first resource block or a first set of bundled resource blocks;
program code for causing the computer to precode data using a random beamformer, wherein the random beamformer includes the first port virtualization matrix and a second precoding matrix selected from a set of precoding matrices associated with the subset of virtualized antenna ports; and
program code for causing the computer to transmit the precoded data in the first transmission block.

Based on the tenth aspect, the non-transitory computer-readable medium of an eleventh aspect, wherein the program code for causing the computer to obtain the port virtualization matrix includes one of:
program code for causing the computer to receive the port virtualization matrix from a UE; or
program code for causing the computer to randomly select a set of orthogonal DFT basis vectors from a predetermined wideband codebook for the port virtualization matrix.

Based on the tenth aspect, the non-transitory computer-readable medium of an twelfth aspect, wherein the program code for causing the computer to transmit the UE-RS and data are executed at rank >1, wherein the data is further precoded with a cyclic delay diversity matrix and a discrete Fourier transform (DFT) rotational matrix along with the random beamformer; wherein the cyclic delay diversity matrix and the DFT rotation matrix cyclically assign each resulting transmission beam to a different layer within a predetermined number of continuous subcarriers.

Based on the tenth aspect, the non-transitory computer-readable medium of a thirteenth aspect, wherein the program code for causing the computer to transmit the UE-RS and data are executed at rank 1 and configured with transmit diversity, wherein the data is further precoded with a space frequency block coding matrix.

Based on the thirteenth aspect, the non-transitory computer-readable medium of a fourteenth aspect, further includes:
program code for causing the computer to determine the first transmission block is the first set of bundled resource blocks;
program code for causing the computer to determine presence of an even number of resource elements for the data in two continuous resource blocks of the first set of bundled resource blocks; and
program code for causing the computer to map the data precoded with the space frequency block coding matrix across two resource blocks of the first set of bundled resource blocks.

Based on the tenth aspect, the non-transitory computer-readable medium of a fifteenth aspect, further includes:
program code for causing the computer to transmit an indication of transmission scheme, wherein the indication of transmission scheme is associated with at least one or more UE-RS ports, the number of useful layers, a mode of transmit diversity or spatial multiplexing for data transmission.

The present disclosure comprises a sixteenth aspect which further comprises the non-transitory computer-readable medium of any combination the tenth through fifteenth aspects.

The present disclosure comprises a seventeenth aspect, such as a non-transitory computer-readable medium having program code recorded thereon, the program code comprising:
program code for causing a computer to measure a reference signal received from a base station;
program code for causing the computer to determine a set of wideband and subband precoders associated with a configured antenna array;
program code for causing the computer to transmit a precoding matrix indicator (PMI), wherein the PMI is associated with a wideband precoding matrix selected from a set of predetermined wideband precoders; and
program code for causing the computer to transmit a channel quality indicator (CQI) generated based on the measured reference signal, wherein the channel quality indicator is generated according to an assumption that precoder elements are cycled from a set of predetermined subband precoders.

Based on the seventeenth aspect, the non-transitory computer-readable medium of an eighteenth aspect,
wherein the CQI includes a single CQI when the rank indicator is >1, and
wherein the CQI includes a first CQI for single port transmissions and a second CQI when transmit diversity is supported, wherein the second CQI includes a difference between the first CQI and a diversity CQI for the transmit diversity.

Based on the seventeenth aspect, the non-transitory computer-readable medium of a nineteenth aspect, wherein the PMI is not reported when the rank indicator is >4, wherein the CQI is generated according to an assumption that precoder elements are cycled from a set of predetermined wideband precoders.

Based on the seventeenth aspect, the non-transitory computer-readable medium of a twentieth aspect, further includes:
program code for causing the computer to receive from the base station configuration of a first, second, and third reporting parameters, wherein the rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

The present disclosure comprises a twenty-first aspect which further comprises the non-transitory computer-readable medium of any combination the seventeenth through twentieth aspects.

The present disclosure comprises a twenty-second aspect, such as an apparatus configured for wireless communication, the apparatus comprising:
at least one processor; and
a memory coupled to the at least one processor,
wherein the at least one processor is configured:
to select a first precoder associated with a first transmission block, wherein the first transmission block includes one of: a first resource block, a first set of bundled resource blocks, or a first sub-resource block selected as a group of contiguous resource elements within a resource block;
to transmit user equipment (UE)-specific reference signals (UE-RS) and data within the first transmission block, wherein the UE-RS and data are precoded using the first precoder;
to select a next precoder associated with a next transmission block, wherein the next transmission block includes one of: a next resource block, a next set of bundled resource blocks, or a next sub-resource block selected as a next group of contiguous resource elements within the resource block; and
to transmit the UE-RS and data in the next transmission block, wherein the UE-RS and data are precoded with a next precoder.

Based on the twenty-second aspect, the non-transitory computer-readable medium of a twenty-third aspect, wherein the first precoder and the next precoder are based on a product of a wideband precoding matrix and a subband precoding matrix, wherein the subband precoding matrix is cyclically selected from a set of predetermined precoding matrices.

Based on the twenty-third aspect, the non-transitory computer-readable medium of a twenty-fourth aspect, wherein the wideband precoding matrix is one of:
received from a UE; or
randomly selected from a set of predetermined wideband precoding matrices.

Based on the twenty-second aspect, the non-transitory computer-readable medium of a twenty-fifth aspect, wherein the configuration of the at least one processor to transmit the UE-RS and data are performed at rank >1, wherein the data is further precoded with a layer permutation matrix along with the first precoder and the next precoder; wherein the layer permutation matrix cyclically assigns each resulting transmission beam to a different layer within a predetermined number of continuous sub carriers.

Based on the twenty-second aspect, the non-transitory computer-readable medium of a twenty-sixth aspect, wherein the configuration of the at least one processor to transmit the UE-RS and data are performed at rank 1 and configured with transmit diversity, wherein the data is further precoded with a space frequency block coding matrix.

Based on the twenty-sixth aspect, the non-transitory computer-readable medium of a twenty-seventh aspect, further including configuration of the at least one processor:
to determine the first transmission block is the first set of bundled resource blocks;
to determine presence of an even number of resource elements for the data in two continuous resource blocks of the first set of bundled resource blocks; and
to map the data precoded with the space frequency block coding matrix across two continuous resource blocks of the first set of bundled resource blocks.

Based on the twenty-second aspect, the non-transitory computer-readable medium of a twenty-eighth aspect, further including configuration of the at least one processor to transmit an indication of transmission scheme, wherein the indication of transmission scheme is associated with at least one or more UE-RS ports, the number of useful layers, a mode of transmit diversity or spatial multiplexing for data transmission.

Based on the twenty-second aspect, the non-transitory computer-readable medium of a twenty-ninth aspect, further including configuration of the at least one processor to determine the first transmission block and the next transmission block based on at least a total number of scheduled resource blocks, wherein a sub-resource block is selected only for a small size resource allocation.

The present disclosure comprises a thirtieth aspect which further comprises the non-transitory computer-readable medium of any combination the twenty-second through twenty-ninth aspects.

The present disclosure comprises a thirty-first aspect, such as an apparatus configured for wireless communication, the apparatus comprising:
at least one processor; and
a memory coupled to the at least one processor,
wherein the at least one processor is configured:
to obtain a first port virtualization matrix for mapping a predetermined number of antennas into a subset of virtualized antenna ports;
to transmit in a first transmission block a user equipment (UE)-specific reference signal (UE-RS) precoded with the first port virtualization matrix, wherein the first transmission block is one of: a first resource block or a first set of bundled resource blocks;
to precode data using a random beamformer, wherein the random beamformer includes the first port virtualization matrix and a second precoding matrix selected from a set of precoding matrices associated with the subset of virtualized antenna ports; and
to transmit the precoded data in the first transmission block.

Based on the thirty-first aspect, the non-transitory computer-readable medium of a thirty-second aspect, wherein the configuration of the at least one processor to obtain the port virtualization matrix includes configuration of the at least one processor to one of:
receive the port virtualization matrix from a UE; or
randomly select a set of orthogonal DFT basis vectors from a predetermined wideband codebook for the port virtualization matrix.

Based on the thirty-first aspect, the non-transitory computer-readable medium of a thirty-third aspect, wherein the configuration of the at least one processor to transmit the UE-RS and data are performed at rank >1, wherein the data is further precoded with a cyclic delay diversity matrix and a discrete Fourier transform (DFT) rotational matrix along with the random beamformer; wherein the cyclic delay diversity matrix and the DFT rotation matrix cyclically assign each resulting transmission beam to a different layer within a predetermined number of continuous subcarriers.

Based on the thirty-first aspect, the non-transitory computer-readable medium of a thirty-fourth aspect, wherein the configuration of the at least one processor to transmit the UE-RS and data are performed at rank 1 and configured with transmit diversity, wherein the data is further precoded with a space frequency block coding matrix.

Based on the thirty-fourth aspect, the non-transitory computer-readable medium of a thirty-fifth aspect, further including configuration of the at least one processor:
- to determine the first transmission block is the first set of bundled resource blocks;
- to determine presence of an even number of resource elements for the data in two continuous resource blocks of the first set of bundled resource blocks; and
- to map the data precoded with the space frequency block coding matrix across two resource blocks of the first set of bundled resource blocks.

Based on the thirty-first aspect, the non-transitory computer-readable medium of a thirty-sixth aspect, further including configuration of the at least one processor to transmit an indication of transmission scheme, wherein the indication of transmission scheme is associated with at least one or more UE-RS ports, the number of useful layers, a mode of transmit diversity or spatial multiplexing for data transmission.

The present disclosure comprises a thirty-seventh aspect which further comprises the non-transitory computer-readable medium of any combination the thirty-first through thirty-sixth aspects.

The present disclosure comprises a thirty-eighth aspect, such as an apparatus configured for wireless communication, the apparatus comprising:
- at least one processor; and
- a memory coupled to the at least one processor,
- wherein the at least one processor is configured:
  - to measure a reference signal received from a base station;
  - to determine a set of wideband and subband precoders associated with a configured antenna array;
  - to transmit a precoding matrix indicator (PMI), wherein the PMI is associated with a wideband precoding matrix selected from a set of predetermined wideband precoders; and
  - to transmit a channel quality indicator (CQI) generated based on the measured reference signal, wherein the channel quality indicator is generated according to an assumption that precoder elements are cycled from a set of predetermined subband precoders.

Based on the thirty-eighth aspect, the non-transitory computer-readable medium of a thirty-ninth aspect,
- wherein the CQI includes a single CQI when the rank indicator is >1, and
- wherein the CQI includes a first CQI for single port transmissions and a second CQI when transmit diversity is supported, wherein the second CQI includes a difference between the first CQI and a diversity CQI for the transmit diversity.

Based on the thirty-eighth aspect, the non-transitory computer-readable medium of a fortieth aspect, wherein the PMI is not reported when the rank indicator is >4, wherein the CQI is generated according to an assumption that precoder elements are cycled from a set of predetermined wideband precoders.

Based on the thirty-eighth aspect, the non-transitory computer-readable medium of a forty-first aspect, further including configuration of the at least one processor to receive from the base station configuration of a first, second, and third reporting parameters, wherein the rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

The present disclosure comprises a forty-second aspect which further comprises the non-transitory computer-readable medium of any combination the thirty-eighth through forty-first aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   measuring a reference signal received from a base station;
   determining a set of wideband and subband precoders associated with a configured antenna array;
   transmitting a precoding matrix indicator (PMI), wherein the PMI is associated with a wideband precoding matrix selected from a set of predetermined wideband precoders; and
   transmitting a channel quality indicator (CQI) generated based on the measured reference signal, wherein the channel quality indicator is generated according to an assumption that precoder elements are cycled from a set of predetermined subband precoders.

2. The method of claim 1,
   wherein the CQI includes a single CQI when a rank indicator is >1.

3. The method of claim 1, wherein the PMI is not reported when a rank indicator is >4, wherein the CQI is generated according to an assumption that precoder elements are cycled from the set of predetermined wideband precoders.

4. The method of claim 1, further including transmitting a rank indicator, wherein the rank indicator corresponds to one of:
   a mode of transmit diversity or spatial multiplexing for data transmission; or
   a number of useful layers in a transmission channel.

5. The method of claim 1, further including:
   receiving from the base station configuration of a first, second, and third reporting parameters, wherein a rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

6. An apparatus configured for wireless communication, comprising:
   means for measuring a reference signal received from a base station;
   means for determining a set of wideband and subband precoders associated with a configured antenna array;
   means for transmitting a rank indicator, wherein the rank indicator corresponds to a number of useful layers in a transmission channel;
   means for transmitting a precoding matrix indicator (PMI), wherein the PMI is associated with a wideband precoding matrix selected from a set of predetermined wideband precoders; and
   means for transmitting a channel quality indicator (CQI) generated based on the measured reference signal, wherein the channel quality indicator is generated according to an assumption that precoder elements are cycled from a set of predetermined subband precoders.

7. The apparatus of claim 6,
   wherein the CQI includes a single CQI when the rank indicator is >1, and
   wherein the CQI includes a first CQI for single port transmissions and a second CQI when transmit diversity is supported, wherein the second CQI includes a difference between the first CQI and a diversity CQI for the transmit diversity.

8. The apparatus of claim 6, wherein the PMI is not reported when the rank indicator is >4, wherein the CQI is generated according to an assumption that precoder elements are cycled from the set of predetermined wideband precoders.

9. The apparatus of claim 6, further including:
   means for receiving from the base station configuration of a first, second, and third reporting parameters, wherein the rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

10. A non-transitory computer-readable medium having program code recorded thereon, the program code comprising:
  program code executable by a computer for causing the computer to measure a reference signal received from a base station;
  program code executable by the computer for causing the computer to determine a set of wideband and subband precoders associated with a configured antenna array;
  program code executable by the computer for causing the computer to transmit a precoding matrix indicator (PMI), wherein the PMI is associated with a wideband precoding matrix selected from a set of predetermined wideband precoders; and
  program code executable by the computer for causing the computer to transmit a channel quality indicator (CQI) generated based on the measured reference signal, wherein the channel quality indicator is generated according to an assumption that precoder elements are cycled from a set of predetermined subband precoders.

11. The non-transitory computer-readable medium of claim 10, wherein the CQI includes a single CQI when a rank indicator is >1.

12. The non-transitory computer-readable medium of claim 10, wherein the PMI is not reported when a rank indicator is >4, wherein the CQI is generated according to an assumption that precoder elements are cycled from the set of predetermined wideband precoders.

13. The non-transitory computer-readable medium of claim 10, further comprising:
  program code executable by the computer for causing the computer to transmit a rank indicator, wherein the rank indicator corresponds to one of:
    a mode of transmit diversity or spatial multiplexing for data transmission; or
    a number of useful layers in a transmission channel.

14. The non-transitory computer-readable medium of claim 10, further comprising:
  program code executable by the computer for causing the computer to receive from the base station configuration of a first, second, and third reporting parameters, wherein a rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

15. An apparatus configured for wireless communication, the apparatus comprising:
  at least one processor; and
  a memory coupled to the at least one processor,
  wherein the at least one processor is configured to:
    measure a reference signal received from a base station;
    determine a set of wideband and subband precoders associated with a configured antenna array;
    transmit a precoding matrix indicator (PMI), wherein the PMI is associated with a wideband precoding matrix selected from a set of predetermined wideband precoders; and
    transmit a channel quality indicator (CQI) generated based on the measured reference signal, wherein the channel quality indicator is generated according to an assumption that precoder elements are cycled from a set of predetermined subband precoders.

16. The apparatus of claim 15, wherein the CQI includes a single CQI when a rank indicator is >1.

17. The apparatus of claim 15, wherein the PMI is not reported when a rank indicator is >4, wherein the CQI is generated according to an assumption that precoder elements are cycled from the set of predetermined wideband precoders.

18. The apparatus of claim 15, wherein the at least one processor is further configured to transmit a rank indicator, wherein the rank indicator corresponds to one of:
  a mode of transmit diversity or spatial multiplexing for data transmission; or
  a number of useful layers in a transmission channel.

19. The apparatus of claim 15, wherein the at least one processor is further configured to receive from the base station configuration of a first, second, and third reporting parameters, wherein a rank indicator is transmitted according to a first periodicity, the PMI is transmitted according to a second periodicity, and the CQI is transmitted according to a third periodicity, wherein the first, second, and third periodicities are based on one or more of the first, second, and third reporting parameters.

* * * * *